United States Patent [19]
Lynch

[11] Patent Number: 5,930,492
[45] Date of Patent: Jul. 27, 1999

[54] RAPID PIPELINE CONTROL USING A CONTROL WORD AND A STEERING WORD

[75] Inventor: Thomas W. Lynch, Austin, Tex.

[73] Assignee: Advanced Micro Devices, Inc., Sunnyvale, Calif.

[21] Appl. No.: 08/820,898

[22] Filed: Mar. 19, 1997

[51] Int. Cl.[6] .................................................... G06F 9/38
[52] U.S. Cl. ................... 395/392; 395/391; 395/800.23; 395/561
[58] Field of Search .................................. 395/395, 391, 395/392, 800.23, 561

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |
| 5,136,697 | 8/1992 | Johnson | 395/586 |
| 5,226,126 | 7/1993 | McFarland et al. | 395/394 |
| 5,226,130 | 7/1993 | Favor et al. | 395/585 |
| 5,465,379 | 11/1995 | Li et al. | 395/800.11 |
| 5,471,626 | 11/1995 | Carnevale et al. | 395/395 |
| 5,532,856 | 7/1996 | Li et al. | 359/118 |
| 5,568,622 | 10/1996 | Stewart et al. | 395/598 |
| 5,598,546 | 1/1997 | Blomgren | 395/385 |
| 5,636,216 | 6/1997 | Fox et al. | 370/402 |
| 5,696,955 | 12/1997 | Goddard et al. | 395/563 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—Parshotam S. Lall
*Assistant Examiner*—Kenneth R. Coulter
*Attorney, Agent, or Firm*—Conley, Rose & Tayon; Lawrence J. Merkel; B. Noel Kivlin

[57] ABSTRACT

A pipeline conveys a control word and a steering word with each instruction. The control word specifies the control signals for the instruction at each pipeline stage. The steering word specifies the routing of the instruction through the pipeline stages. Many pipeline modifications may be made by modifying the control words and steering words corresponding to the instructions. According to one embodiment, the execution pipeline within the microprocessor employs the control word/steering word method of pipeline control. Certain instructions do not perform any multiplication operations, and so may bypass the multiply pipeline stage or stages. Similarly, other instructions do not perform addition operations and may bypass the adder pipeline stage or stages. Still further, data movement and control update type instructions may bypass the pipeline all together and move directly to the result queue in the FPU. Additional instructions may be implemented in many cases by adding a control word and steering word for the instructions into the control word/steering word generation. Additional instructions may be implemented in this manner if the hardware within the pipeline can be used to implement the instruction.

22 Claims, 14 Drawing Sheets

RAPID PIPELINE CONTROL USING A CONTROL WORD AND A STEERING WORD

BACKGROUND OF THE INVENTION

1. Field of the Invention

This invention relates to the field of microprocessors and, more particularly, to the control of pipelines within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion.

Generally speaking, a pipeline comprises a number of pipeline stages at which portions of a particular task are performed. The portion of the particular task performed at a given pipeline stage comprises the "operation" performed by that pipeline stage. Different stages may simultaneously operate upon different items, thereby increasing overall throughput. Although the instruction processing pipeline may be divided into any number of pipeline stages at which operations comprising instruction processing are performed, instruction processing generally comprises fetching the instruction, decoding the instruction, executing the instruction, and storing the execution results in the destination identified by the instruction.

Instruction processing pipelines may be quite complex. Particularly, different instructions may follow different paths through the instruction processing pipeline. For example, an instruction may not require the operation performed by a particular pipeline stage. Therefore, the instruction may skip the particular pipeline stage and be conveyed directly from a pipeline stage preceding the particular pipeline stage to the pipeline stage succeeding the particular pipeline stage in the instruction processing pipeline. Still further, a particular pipeline stage may provide an instruction to one of a number of pipeline stages depending upon the instruction. For example, floating point instructions often perform either a multiplication operation or an addition operation. Therefore, a particular floating point instruction may be routed to a pipeline stage or stages for performing addition or another set of pipeline stage or stages for performing multiplication. Similarly, integer instructions may be routed to different pipeline stages based upon the definition of the instruction.

Each pipeline stage of the instruction processing pipeline incorporates dataflow elements for performing the operation defined for that stage. The dataflow elements often require control signals to direct the operation of the dataflow elements upon input operands in order to produce a result. The control signals may vary according to the instruction conveyed to the pipeline stage. For example, an adder dataflow element may require a carry-in input which is to be added to the operand values being added. Certain instructions may define the carry-in to be zero, while others may define the carry-in to be a condition flag defined by the microprocessor architecture. Therefore, the carry-in control signal for the adder dataflow element is generated by the stage according to the instruction.

Typically, such routing of instructions to one of a set of pipeline stages and the control of dataflow elements in a particular pipeline stage is performed via specialized decode logic within each pipeline stage. The pipeline stage determines how to route the instruction and the control signals dictated by the instruction from the instruction information provided to the stage (e.g. opcode, addressing modes used by the instruction, etc.). Unfortunately, if the pipeline is modified by adding or deleting pipeline stages or by redefining the operation performed at a given pipeline stage, the decode logic incorporated into many of the pipeline stages may require modification. Locating and correctly modifying the decode logic is a difficult and time consuming task. A better method for performing control within pipeline stages and routing between pipeline stages is therefore desired.

SUMMARY OF THE INVENTION

The problems outlined above are in large part solved by pipeline in accordance with the present invention. As instructions are placed into the pipeline, a control word and a steering word are conveyed into the pipeline as well. The control word specifies the control signals for the instruction at each pipeline stage, thereby eliminating the need for specialized decoding logic at each stage to generate the control signals. The steering word specifies the routing of the instruction through the pipeline stages, similarly eliminating the need for specialized decoding logic at each stage to generate the routing controls. Advantageously, many pipeline modifications may be made by modifying the control words and steering words corresponding to the instructions. Since the control words and steering words are generated in a centralized location within the microprocessor, changes may be made more readily than if the pipeline control were distributed throughout the pipeline. Changes within the pipeline may thereby be limited to wiring changes and to the stages directly being modified.

Moreover, since specialized decoding logic is not required at each pipeline stage to generate the control signals and routing controls, the overall clock speed at which the pipeline operates may be increased. Advantageously, performance of a microprocessor implementing control words and steering words may be increased in proportion to the increased clock speed.

According to one embodiment, the execution pipeline within the microprocessor employs the control word/steering word method of pipeline control. Certain instructions do not perform any multiplication operations, and so may bypass the multiply pipeline stage or stages. Similarly, other instructions do not perform addition operations and may bypass the adder pipeline stage or stages. Still further, data movement and control update type instructions may bypass the pipeline all together and move directly to the result queue in the FPU. Through the use of the control word and the steering word, pipeline control is simplified.

Yet another advantage of the control word/steering word approach to pipeline control is that additional instructions may be implemented in many cases simply by adding a control word and steering word for the instructions into the control word/steering word generation. Additional instructions may be implemented in this manner if the hardware within the pipeline can be used to implement the instruction. This feature may prove quite useful when coding microcode routines, for example, if a set of commonly performed operations is detected. The set of commonly performed operations may be defined as a new instruction, with a control word and a steering word indicating how the instruction is to be executed by the pipeline of the microprocessor.

Broadly speaking, the present invention contemplates an instruction processing pipeline for a microprocessor comprising a first pipeline stage, a second pipeline stage, and a third pipeline stage. The first pipeline stage is coupled to receive a first input operand, a first control word, and a first steering word. The first pipeline stage is configured to perform a first operation upon the first input operand in response to the first control word, thereby producing a first output operand. Furthermore, the first pipeline stage is configured to produce a second control word and a second steering word. Coupled to the first pipeline stage to receive the first output operand, the second control word, and the second steering word, the second pipeline stage is configured to perform a second operation upon the first output operand, thereby producing a second output operand. Also coupled to the first pipeline stage to receive the first output operand, the second control word, and the second steering word, the third pipeline stage is configured to perform a third operation upon the first output operand, thereby producing a third output operand. The first pipeline stage is configured to route the first output operand, the second control word, and the second steering word to the second pipeline stage in response to a first encoding of the first steering word. Additionally, the first pipeline stage is configured to route the first output operand, the second control word, and the second steering word to the third pipeline stage in response to a second encoding of the first steering word different from the first encoding.

The present invention further contemplates a method for routing an instruction through an instruction processing pipeline of a microprocessor. A control word and a steering word are generated for the instruction. The control word dictates an operation to be performed at each of a plurality of pipeline stages comprising the instruction processing pipeline. The steering word dictates which of the plurality of pipeline stages receives the instruction. The instruction, the control word, and the steering word are conveyed to a first one of the plurality of pipeline stages. The first one of the plurality of pipeline stages operates upon an operand of the instruction in response to the control word. The instruction, the control word, and the steering word are conveyed to a second one of the plurality of pipeline stages in response to the steering word.

The present invention still further contemplates a microprocessor comprising an MROM unit and a floating point unit. The MROM unit is configured to dispatch a floating point instruction to the floating point unit. Coupled to the MROM unit, the floating point unit is configured to generate a control word and a steering word upon receipt of the floating point instruction. The floating point unit includes an execution pipeline, and operates upon an operand of the floating point instruction within the execution pipeline in response to the control word. Additionally, the floating point unit routes the floating point instruction through the execution pipeline in response to the steering word.

BRIEF DESCRIPTION OF THE DRAWINGS

Other objects and advantages of the invention will become apparent upon reading the following detailed description and upon reference to the accompanying drawings in which.

Figure 1:
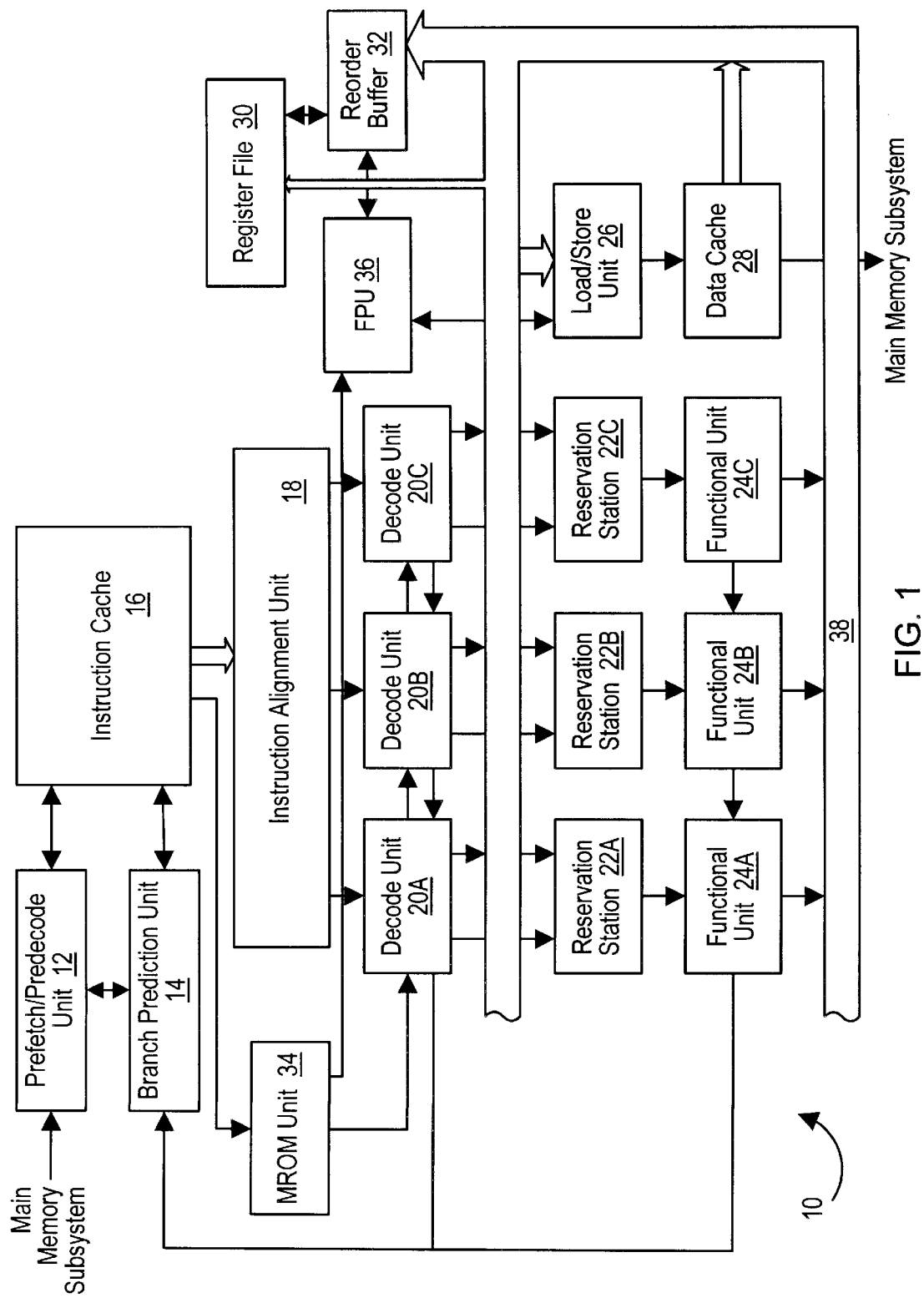
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM (microcode ROM) unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU 36. Finally, FPU 36 is coupled to load/store unit 26 and reorder buffer 32.

Generally speaking, microprocessor 10 employs an instruction processing pipeline for executing instructions. The pipeline is distributed among the blocks illustrated in FIG. 1. Certain pipeline stages within the instruction processing pipeline are configured to route instructions to one of a set of pipeline stages depending upon the instruction encoding. A steering word is provided for the instruction when the instruction enters the instruction processing pipeline. The steering word identifies the stages through which the instruction is routed. According to one embodiment, the steering word comprises multiple steering fields (one field per pipeline stage). Each steering field contains a value which selects one of the pipeline stages to which the corresponding pipeline stage is configured to convey an instruction. If a particular pipeline stage is configured to route an instruction to only one other pipeline stage, a corresponding steering field may not be included within the steering word.

Additionally, a control word is provided for the instruction. The control word provides control signals for each pipeline stage which are appropriate for the provided instruction. According to one embodiment, the control word comprises multiple control fields (one field per pipeline stage). Each control field provides control signals for one of the pipeline stages which receives the instruction. Similar to the steering word, the control word may not include a control field for a pipeline stage which does not require control signals (i.e. a pipeline stage which always performs the same function).

Advantageously, the pipeline stages need not include specialized decoding logic for generating control signals and routing controls. Overall clock speed within the microprocessor may be increased by the fact that the decoding is not performed. Instead, the control word provides the control signals and the steering word provides routing controls. If the pipeline is modified in such a way that the routing for a particular instruction from a particular pipeline stage is changed, then the steering word generated for that particular instruction is modified instead of modifying logic within the particular pipeline stage. If a pipeline stage is redesigned with dataflow elements requiring different control signals, the control words for each instruction which uses that pipeline stage are modified to provide the appropriate controls instead of redesigning control logic within that pipeline stage.

The control words and steering words may, for example, be stored in a read-only memory (ROM). A decoder is provided to decode each instruction and read the appropriate control and steering words from the ROM. The control and steering words are then conveyed with the instruction into the instruction processing pipeline. Since the decoder and ROM are centralized (as opposed to distributed among the pipeline stages), changing the pipeline is simplified. Furthermore, pipeline changes are effected simply by changing the control words and steering words stored in the ROM.

According to one particular embodiment, the execution pipeline of FPU 36 is arranged to operate using control words and steering words. Certain floating point instructions may be routed to the multiply stage(s) but not the add stage(s), while other floating point instructions are routed to the add stage(s) but not the multiply stage(s). Still further, other instructions which do not specify an arithmetic operation (such as data movement instructions or instructions which update floating point environment registers) may skip the arithmetic portion of the execution pipeline and move directly to the result area of the pipeline to await retirement.

According to one embodiment of microprocessor 10, floating point instructions are classified as MROM (i.e. microcode) instructions for instruction fetching and dispatch purposes in instruction cache 16. The floating point instructions are routed to MROM unit 34. MROM unit 34 parses the floating point instruction into a floating point operation which is transmitted to floating point unit 36 and one or more load/store operations for load/store unit 26 to perform to retrieve memory operands for the instruction. FPU 36 executes the floating point instruction upon receipt of any memory operands. As used herein, a "memory operand" of an instruction is an operand which is stored in a memory location (as opposed to a register within microprocessor 10). The memory operand is located via an address formed by adding one or more of the following: the contents of one or two registers, an immediate field of the instruction, and a displacement field of the instruction.

Microprocessor 10 is configured to operate upon various data types in response to various instructions. For example, certain instructions are defined to operate upon an integer data type. The bits representing an integer form the digits of the integer number. The decimal binary is assumed to be to the left of the digits (i.e. integers are whole numbers). Another data type often employed in microprocessors is the floating point data type. Floating point numbers are represented by a significand and an exponent. The base for the floating point number is raised to the power of the exponent and multiplied by the significand to arrive at the number represented. While any base may be used, base 2 is common in many microprocessors. The significand comprises a number of bits used to represent the most significant digits of the number. Typically, the significand comprises one bit to the left of the binary point, and the remaining bits to the right of the binary point. The bit to the left of the binary point is not explicitly stored, instead it is implied in the format of the number. Generally, the exponent and the significand of the floating point number are stored. Additional information regarding the floating point numbers and operations performed thereon may be obtained in the Institute of Electrical and Electronic Engineers (IEEE) standard 754. Floating point instructions, therefore, are instructions having at least one operand of the floating point data type.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

Start bits 10000
End bits 00001
Functional bits 11000

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively- executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded.

Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address' tags. A set of physical tags (not shown) may be employed for mapping the linear addresses to physical addresses and for detecting translation aliases. Additionally, the physical tag block may perform linear to physical address translation.

Figure 2:
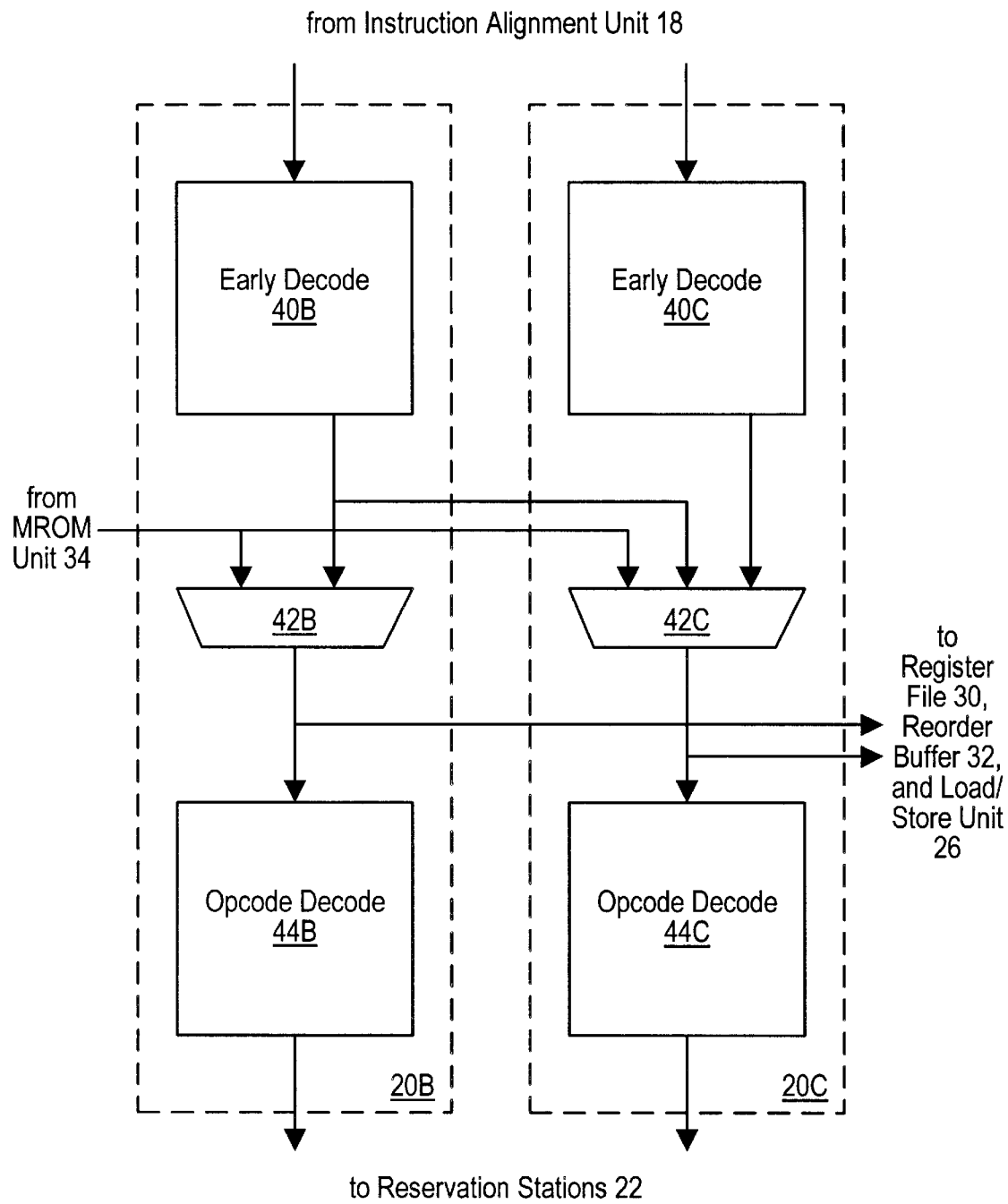
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C.

Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
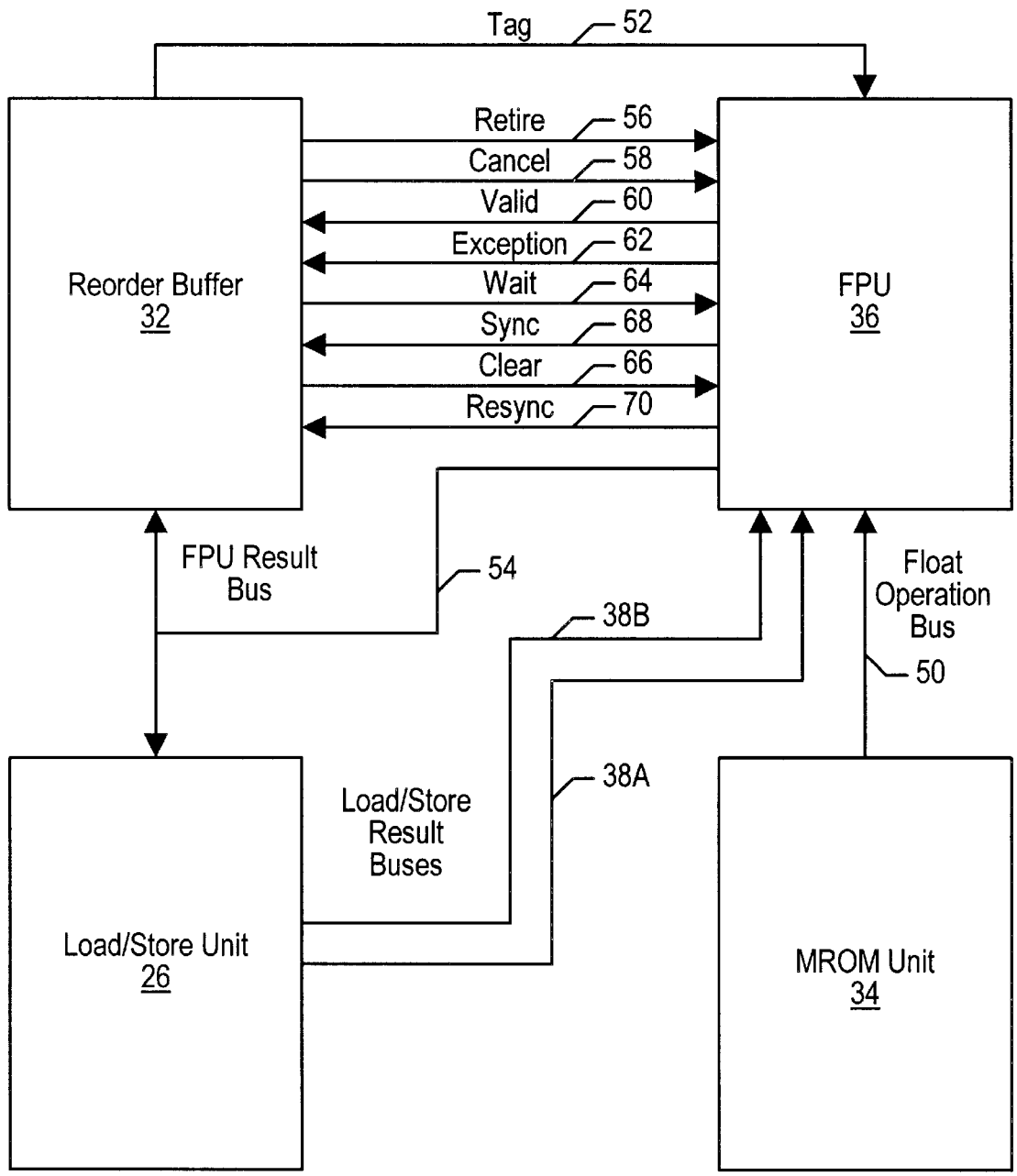
FIG. 3 is a block diagram of a floating point unit, a reorder buffer, a load/store unit, and an MROM unit shown in FIG. 1, highlighting interconnection therebetween according to one embodiment of the microprocessor.

Turning now to FIG. 3, a block diagram of load/store unit 26, reorder buffer 32, FPU 36, and MROM unit 34 is shown. Interconnection between the blocks is highlighted in FIG. 3 according to one embodiment of microprocessor 10. Additional interconnection may be provided as desired according to design choice.

As mentioned above, MROM unit 34 receives floating point instructions from instruction cache 16 and parses the floating point instruction into a floating point operation and memory operations to retrieve and store memory operands for the instructions. Additionally, certain floating point instructions may require activity other than memory operations from functional units 24. For example, a floating point instruction defined to store the floating point state to a set of memory locations may access one or more registers which are not configured into FPU 36. As a more particular example, the instruction pointer may be maintained within reorder buffer 32 according to one embodiment, and the instruction pointer is part of the floating point state. MROM unit 34 parses such instructions into integer instructions to be executed by functional units 24.

MROM unit 34 provides the floating point operation upon a float operation bus 50 coupled between MROM unit 34 and FPU 36. The floating point operation includes the opcode, which defines the requested floating point operation, and register specifiers for any register operands used by the instruction. The memory operand, if one is included in the instruction, is provided by load/store unit 26. Concurrent with MROM unit 34 providing the floating point operation, MROM unit 34 provides the memory operation instructions between early decode units 40 and opcode decode units 44, as shown in FIG. 2. Reorder buffer 32 provides the reorder buffer tag assigned to the memory operations upon a tag bus 52 coupled between reorder buffer 32 and FPU 36. According to the present embodiment, reorder buffer 32 is a line-oriented reorder buffer as described above. For such an embodiment, reorder buffer 32 provides the line tag upon tag bus 52. Using the supplied tag, FPU 36 can identify the memory operand data as it is provided from load/store unit 26.

Load/store unit 26 provides memory operand data upon load/store result buses 38A and 38B. Result buses 38A and 38B may comprise a portion of result buses 38. Alternatively, load/store result buses 38 may comprise dedicate buses for providing values to FPU 36. Each load/store result bus 38A and 38B is capable, in one embodiment, of providing a 32 bit data word and a reorder buffer tag identifying the data word. The reorder buffer tag comprises both the line and offset portions. The line portion identifies the floating point instruction to which the data word belongs, and the offset portion defines the portion of the memory operand being provided by the data word. A floating point memory operand may comprise as many as 80 bits, requiring up to two 32 bit data words and a 16 bit data word from load/store unit 26.

FPU 36 may provide results to either reorder buffer 32 or load/store unit 26. For example, a destination for an instruction may be a memory location. FPU 36 communicates the result of the instruction upon FPU result bus 54 to load/store unit 26 for storage. Additionally, a floating point instruction is defined which causes a floating point value to be stored into an integer register (specifically, the AX register of the x86 microprocessor architecture, in one embodiment). FPU result bus 54 is therefore coupled to reorder buffer 32. The floating point registers are configured within FPU 36, allowing floating point results to be stored therein for floating point instructions having targets within the floating point registers.

Reorder buffer 32 coordinates the in-program-order retirement of instructions. Since floating point instructions often retire within FPU 36, an interface between reorder buffer 32 and FPU 36 is used for communicating the retirement of floating point instructions. The interface provides a loose coupling between FPU 36 and reorder buffer 32 such that one unit can get "ahead of" the other. For example, reorder buffer 32 may indicate that a particular instruction can be retired and FPU 36 may not yet have executed the instruction. FPU 36 may accept a retirement indication for the instruction if the instruction will not create an exception, and retire the instruction internal to FPU 36 upon completion. Similarly, FPU 36 can complete instructions and buffer them internally until a reorder buffer 32 retires (or cancels) the instructions.

The signals employed according to one embodiment of the loosely coupled interface are shown in FIG. 3. A retire signal is conveyed by reorder buffer 32 upon a retire conductor 56 coupled to FPU 36. Reorder buffer 32 conveys a cancel signal upon a cancel conductor 58 coupled to FPU 36. FPU 36 conveys a valid signal upon a valid conductor 60 and an exception signal upon an exception conductor 62, both of which are coupled to reorder buffer 32. Reorder buffer 32 provides a wait signal upon a wait conductor 64 and a clear signal upon a clear conductor 66, both of which are coupled to FPU 36. Finally, FPU 36 provides a sync signal upon a sync conductor 68 and a resync signal upon a resync conductor 70, both of which are coupled to reorder buffer 32.

The retire, cancel, valid, and exception signals provide the basic interface for retiring and canceling instructions. Reorder buffer 32 asserts the retire signal when a floating point instruction is to be retired. The retire signal is asserted for each floating point instruction in program order, allowing a single signal to be used. Alternatively, an instruction can be canceled (i.e. discarded from the execution pipeline within FPU 36) via assertion of the cancel signal. FPU 36 may be configured to store an assertion of the retire signal until the corresponding instruction is completed by FPU 36 (i.e. until the instruction exits the execution pipeline of FPU 36). Once the retire signal has been asserted for a given instruction, FPU 36 may proceed with updating the destination register with the result of the instruction (provided certain floating point exceptions are masked off).

FPU 36 provides the status of each instruction using the valid signal and the exception signal. If an instruction completes without creating an exception, the valid signal is asserted for that instruction. If the instruction does create an exception, the exception signal is asserted. Similar to the retire signal assertions, assertions of the valid and/or exception signals are queued by reorder buffer 32 and associated with floating point instructions in program order.

The wait and sync signals are used to implement a floating point synchronization instruction (e.g. FWAIT in the x86 microprocessor architecture). A floating point synchronization instruction is used to synchronize the floating point and the integer portions of microprocessor 10. Particularly, floating point exceptions are inexact. The floating point synchronization instruction can be used to check for any exceptions with respect to a particular floating point instruction. When the floating point synchronization instruction is ready to be retired, reorder buffer 32 asserts the wait signal. FPU 36 asserts the sync signal when FPU 36 is synchronized. Upon assertion of both signals, the floating point synchronization instruction is complete.

The resync signal is used to delete speculative state (i.e. discard any remaining instructions within reorder buffer 32) and refetch instructions starting with the next instruction after the instruction which is foremost, in program order, within reorder buffer 32. The foremost instruction within reorder buffer 32 is retired. The clear signal is used by reorder buffer 32 in a similar fashion: if the clear signal is asserted, FPU 36 deletes any speculative state stored therein.

Figure 4:
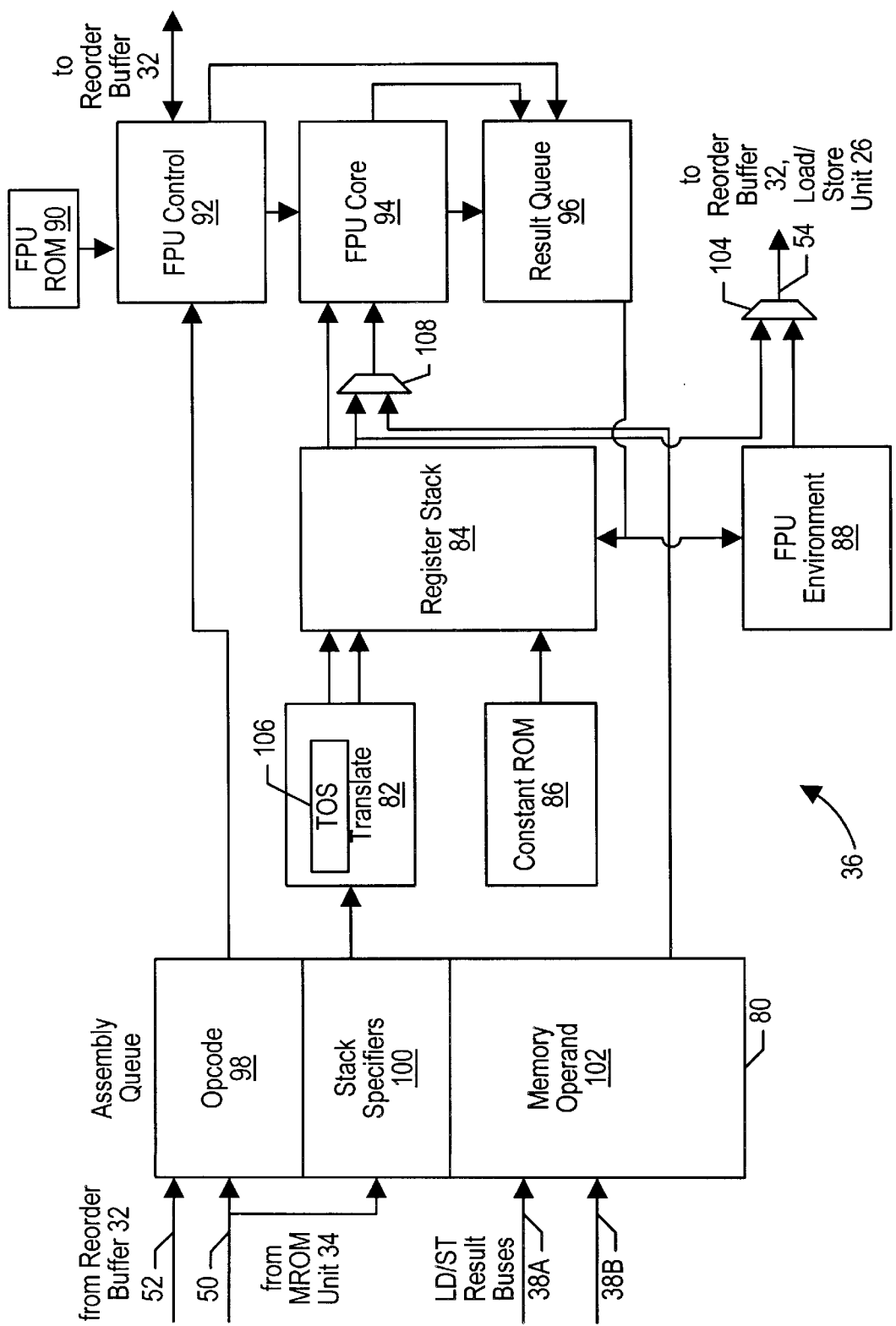
FIG. 4 is a block diagram of one embodiment of the floating point unit shown in FIG. 3.

Turning next to FIG. 4, a block diagram of one embodiment of FPU 36 is shown. As shown in FIG. 4, FPU 36 includes an assembly queue 80, and translate unit 82, a register stack 84, a constant read-only memory (ROM) 86, an FPU environment unit 88, an FPU ROM 90, an FPU control unit 92, and FPU core 94, and a result queue 96. Assembly queue 80 comprises multiple queue entries, each of which is configured to store instruction information corresponding to one instruction. As shown in FIG. 4, assembly queue 80 includes several fields for each entry. An opcode field 98 is included for storing the opcode of the floating point instruction and the corresponding reorder buffer tag, and a stack specifiers field 100 is included for storing register specifiers which select storage locations within register stack 84. The selected registers provide operands for the corresponding instructions. The values stored in opcode field 98 and stack specifier field 100 are received by FPU 36 upon float operation bus 50 from MROM unit 34 and tag bus 52 from reorder buffer 32. Assembly queue 80 further includes a memory operand field 102 for storing a memory operand used by the instruction. The memory operand is received upon load/store result buses 38A and 38B.

Assembly queue 80 is coupled to FPU control unit 92 and to translate unit 82. Translate unit 82 is coupled to register stack 84, which is further coupled to constant ROM 86, result queue 96, and FPU core 94. FPU environment 88 is coupled to result queue 96 and is coupled to provide, through multiplexor 104, a result upon FPU result bus 54. Register stack 84 may also provide a result upon FPU result bus 54 through multiplexor 104. FPU control unit 92 is coupled to FPU ROM 90, result queue 96, and FPU core 94. FPU core 94 is further coupled to result queue 96. FPU control unit 92 is further coupled to receive the signals forming the interface between FPU 36 and reorder buffer 32 (e.g. the signals upon conductors 52, 56, 58, 60, 62, 64, 66, 68, and 70).

Generally speaking, instructions and their corresponding memory operands are received into assembly queue 80. Instructions are dispatched from assembly queue 80 into the execution pipeline of FPU 36. Upon exit from the execution pipeline, the results of the instruction are stored into result queue 96. The results are held in result queue 96 until a retire indication is received from reorder buffer 32. Upon receipt of the retire indication, the results are stored into register stack 84 (or FPU environment 88, if the destination of the instruction is an FPU environment register such as the control word or the status word).

When an instruction is dispatched into the execution pipeline, the stack specifiers for the instruction are conveyed to translate unit 82. FPU 36 uses a stack-based register file in which one of the registers is defined to be the top of the stack. Certain instructions are defined to push a value onto or pop a value from the stack. Pushing a value onto the stack comprises storing the value into a register adjacent to the register which is currently the top of the stack and making that adjacent register the top of the stack. Popping a value from the stack comprises reading the value from the register which is currently the top of the stack and making the stack pointer indicate an adjacent register. Most of the floating point instructions use stack-relative register specifiers (i.e. the specifier indicates the register which is the top of the stack or the register which is at a particular offset from the top of the stack). Therefore, the register specifier is sometimes dependent upon the instructions which execute prior to that instruction (since these instructions may affect which register is the top of the stack). Translate unit 82 maps the stack specifiers to the registers within register stack 84 based upon a speculative top of stack value which reflects execution of the instructions prior to a particular instruction in program order (including the instructions still within the execution pipeline of FPU 36). A top of stack (TOS) register 106 is included for storing the top of stack indicator. Additionally, a table is provided within translate unit 82 for mapping each register to its stack relative position. Registers may become out of order in the stack due to an exchange instruction which exchanges the contents of a pair of registers. Such an instruction may be implemented by swapping their addresses within the table instead of physically swapping the contents of the corresponding registers.

Translate unit 82 provides the translated register specifiers to register stack 84, which reads the values from the corresponding register locations and provides the values to FPU core 94. The memory operand for the instruction may be substituted for one of the operands from register stack 84 via multiplexor 108. Register stack 84 includes the architected FPU registers defined by the microprocessor architecture employed by microprocessor 10. For example, embodiments of microprocessor 10 employing the x86 microprocessor architecture include eight architected registers within register stack 84. Additionally, register stack 84 may include temporary registers for use by floating point microcode routines stored in FPU ROM 90, as described below. In one embodiment, 24 temporary registers are included.

FPU core 94 includes the hardware used to manipulate the source operands of the floating point instruction in order to produce the result of the instruction. For example FPU core 94 includes a multiplier for multiplying the input operands, an adder for adding the input operands, etc. FPU core routes the operands to the various pieces of hardware in response to control signals from FPU control unit 92. FPU control unit 92 receives the opcode for a given instruction from assembly queue 80 and routes the instruction through the execution pipeline accordingly. Certain instructions may not use any of the hardware at a particular stage of the execution pipeline. These instructions are routed around the particular stage, so as to exit the execution pipeline more rapidly. Additionally, FPU control unit 92 handles the interface to reorder buffer 32 and communicates with other elements of FPU 36 according to communications upon the interface. For example, when a particular instruction receives a retire indication, FPU control unit 92 communicates with result queue 96 to cause the corresponding instruction result to be stored into register stack 84. If the instruction has not yet been completed, result queue 96 queues the retire indication until the instruction is completed.

Floating point instructions are classified by FPU 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in FPU ROM 90. Effectively, the transcendental instructions make multiple passes through the execution pipeline in order to complete. Intermediate results are calculated by the instructions within the microcoded routine, and the final result is formed by calculating upon the intermediate results.

The microcoded routines may make use of a set of constants stored in constant ROM 86. The constants stored in constant ROM 86 are useful in calculating results for the transcendental instructions. For example, the floating point representations of 1, 0, −1, Pi, etc., as well as constants particular to the microcoded routines may be stored in constant ROM 86. The constants may be loaded into temporary registers for use by the microcoded routines. According to one embodiment, constant ROM 86 stores 128 double precision constants and 64 single precision constants.

FPU environment 88 stores control and status information regarding the state of FPU 36. A control word may be stored which indicates the rounding and precision modes of FPU 36 as well as a mask for various floating point exceptions. A status word may also be stored which indicates which floating point exceptions have been detected, the top of stack pointer, etc.

According to one particular embodiment, FPU 36 executes instructions in program order. The instructions are received into assembly queue 80 in program order, and are provided into the execution pipeline of FPU 36 in program order as well. An instruction may be ready for execution within assembly queue 80 (i.e. all operands provided) but may remain stored therein because another instruction prior the instruction in program order is not ready for execution. In other words, assembly queue 80 operates as a first-in, first-out (FIFO) buffer. Similarly, results are stored from result queue 96 into register stack 84 and/or FPU environment 88 in program order. Alternatively, assembly queue 80 may operate similar to reservation stations 22 and result queue 96 may operate similar to reorder buffer 32. In such an embodiment, FPU 36 may execute instructions out of order.

Figure 5:
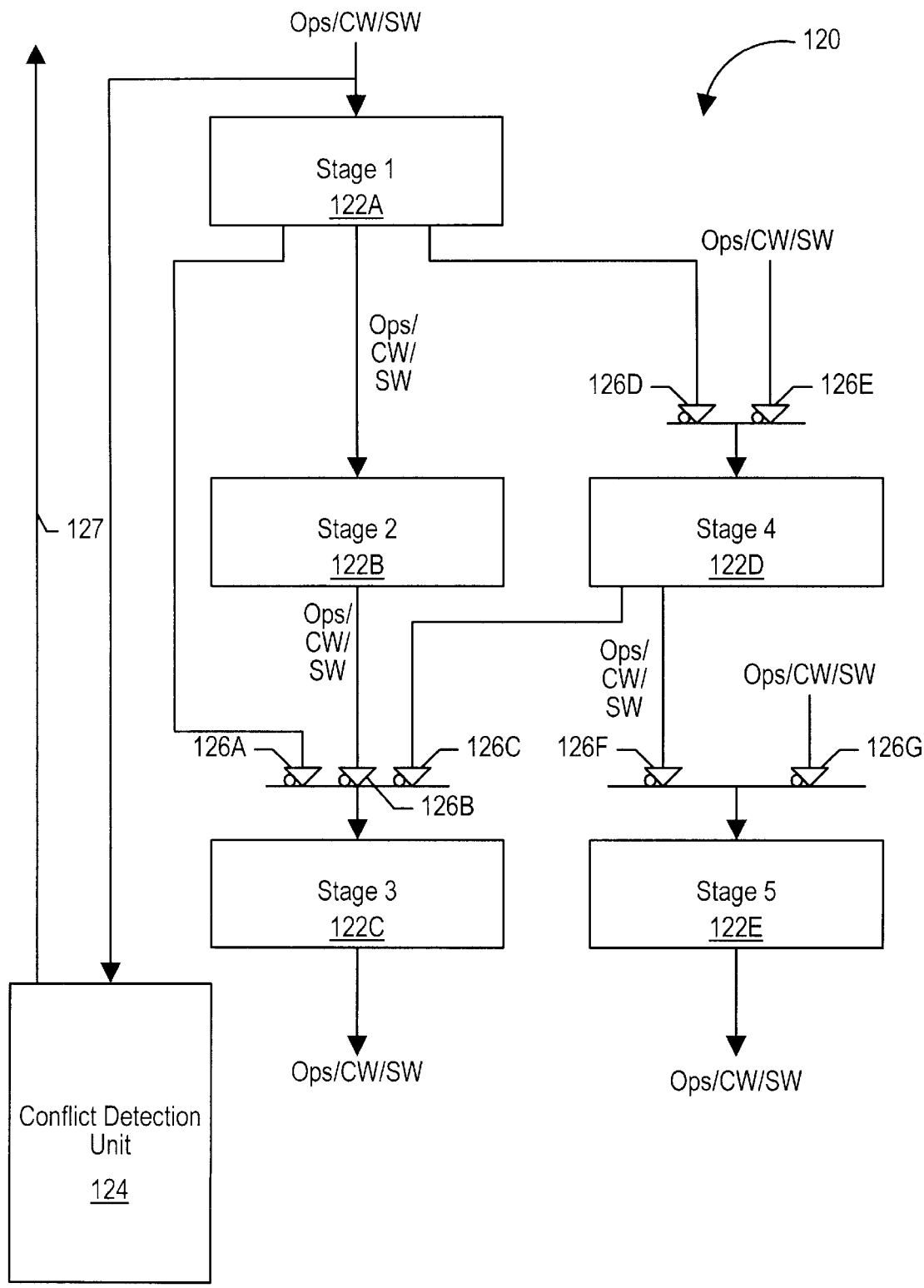
FIG. 5 is a block diagram illustrating a portion of one embodiment of an instruction processing pipeline.

Turning now to FIG. 5, a block diagram illustrating a portion of an instruction processing pipeline 120 employed by one embodiment of microprocessor 10 is shown. The portion of instruction processing pipeline stage 120 includes a first pipeline stage 122A, a second pipeline stage 122B, a third pipeline stage 122C, a fourth pipeline stage 122D, and a fifth pipeline stage 122E. Additionally, a conflict detection unit 124 is shown. First pipeline stage 122A is coupled to route an instruction to one of second pipeline stage 122B, third pipeline stage 122C, or fourth pipeline stage 122D, depending upon the steering word provided with the instruction. Second pipeline stage 122B is coupled to route an instruction to third pipeline stage 122C. Fourth pipeline stage 122D is further configured to route an instruction to either third pipeline stage 122C or fifth pipeline stage 122E, depending upon the steering word provided with the instruction. Additionally, fourth pipeline stage 122D may receive an instruction from a pipeline stage (not shown) other than first pipeline stage 122A. Similarly, fifth pipeline stage 122E is configured to receive an instruction from a pipeline stage (not shown) other than fourth pipeline stage 122D. Conflict detection unit 124 is coupled to receive the information provided to first pipeline stage 122A. The pipeline stages 122A–122E will be collectively referred to herein as pipeline stages 122.

First pipeline stage 122A is coupled to receive operands and other instruction information for a particular instruction from a preceding pipeline stage (not shown). A corresponding control word and steering word are also received. First pipeline stage 122A performs a first operation upon one or more of the operands of the particular instruction under control of the control word, producing a resulting operand or operands. The resulting operands, instruction information, control word, and steering word are then relayed to a next pipeline stage under the control of the steering word. Other pipeline stages 122B–122E are configured similarly.

For the embodiment of the FIG. 5, tristating drivers are used to convey information between pipeline stages if the receiving pipeline stage may receive information from more than one sending pipeline stage. For example, tristate drivers 126A, 126B, and 126C are used to drive information to third pipeline stage 122C from either first pipeline stage 122A, second pipeline stage 122B, or fourth pipeline stage 122D. A tristating driver is designed to drive a value upon its output or to tristate (i.e. become inactive and allow its output to float) based upon an enable signal. If the enable signal is asserted, the tristating driver drives the received value. If the enable signal is inactive, the tristating driver remains inactive. Since the tristating driver is inactive when not enabled, the outputs of several tristating drivers can be connected together as long as at most one enable signal is asserted at any given time. Therefore, for example, tristating drivers 126A, 126B and 126C have their outputs coupled together. Third pipeline stage 122C receives the combined outputs of tristating drivers 126A, 126B, and 126C. Tristating drivers 126D and 126E are used to provide input operands, etc. to fourth pipeline stage 122D. Similarly, tristating drivers 126F and 126G are used to provide input operands, etc. to fifth pipeline stage 122E.

For the embodiment shown in FIG. 5, the steering word is used to generate the enable signals for tristating drivers 126 and for generating a valid indication to be conveyed to those pipeline stages which receive input operands, etc. from only one other pipeline stage. For example, first pipeline stage 122A uses the steering word to generate enable signals for tristating drivers 126A and 126D as well as a valid indication for second pipeline stage 122B.

According to one embodiment, the steering word comprises a number of steering fields and the control word comprises a number of control fields. Each steering field provides routing controls for a different pipeline stage. Similarly, each control field provides control signals for a different pipeline stage. Generally, the control fields are individual control signals to be used by the dataflow elements within the corresponding pipeline stage. The steering field may comprise an encoded value which is treated as a number identifying one of the pipeline stages to which the corresponding pipeline stage is configured to convey values. The number may be relative to the pipeline stage (e.g. third pipeline stage 122C may be identified via a steering field encoding of "00" binary for first pipeline stage 122A but by a steering field encoding of "1" binary for fourth pipeline stage 122D). Alternatively, each pipeline stage may be assigned a different number than each other pipeline stage (an "absolute" number), and the absolute number may be provided in the steering fields. The use of relative numbers reduces the overall size of the steering word, while the use of absolute numbers leads to a uniform size of the steering fields for each pipeline stage and may be more general. The steering field may also be implemented as a decoded value such as a one-hot encoding. In a one-hot encoding, each bit of the field is assigned to a different destination pipeline stage. If the bit assigned to a particular destination pipeline stage is set, the pipeline stage corresponding to the steering field routes the instruction to the particular destination pipeline stage. If the bit is clear, the particular destination pipeline stage does not receive the instruction. Accordingly, at most one bit in the one-hot encoding is set for normal operation.

Since different instructions take different paths through instruction processing pipeline 120, the control word and steering word received by each pipeline stage may be modified by that pipeline stage before routing the control word and steering word to the next pipeline stage. The modified control word and steering word allows the receiving pipeline stage to detect the appropriate steering field and control field for use by the receiving pipeline stage, regardless of the path through instruction processing pipeline 120 taken by the instruction. According to one embodiment, each pipeline stage 122 deletes the control field and steering field used by that pipeline stage 122 from the control word and steering word, respectively. The modified control and steering words are then routed to the next pipeline stage 122 as defined by the steering field for that pipeline stage. According to one specific embodiment, the control word is shifted by the number of bits included in the corresponding control field and the steering word is shifted by the number of bits included in the corresponding steering field. Other deletion methods may be employed by other embodiments. Alternatively, the fields may not be deleted. Each stage may be configured to locate its corresponding control field and steering field within the control word and steering word, respectively.

For example, the control field and steering field for third pipeline stage 122C may be located in the second control field and the second steering field of the control word and steering word received by first pipeline stage 122A (if the steering field for first pipeline stage 122A indicates that the corresponding instruction is to be routed to third pipeline stage 122C from first pipeline stage 122A). Alternatively, the control field and steering field for third pipeline stage 122C may be located in the third control field and third steering field of the control word and steering word received by first pipeline stage 122A (if the steering field for first pipeline stage 122A indicates that the corresponding instruction is to be routed to either second pipeline stage 122B or fourth pipeline stage 122D from first pipeline stage 122A). By deleting the control field and steering field used by a particular pipeline stage from the control word and steering word conveyed to the next pipeline stage, the control field and steering field for the next pipeline stage is always located at one end of the control word and steering word (i.e. in the most significant bits or the least significant bits of the words).

Since different instructions take different paths through instruction processing pipeline 120, it is possible that two instructions within instruction processing pipeline 120 may be scheduled for delivery to the same pipeline stage 122 during the same clock cycle. For example, a first instruction within second pipeline stage 122B and a second instruction simultaneously within first pipeline stage 122A having a steering field directing the second instruction to third pipeline stage 122C are both scheduled to move to third pipeline stage 122C during the succeeding clock cycle. Conflict detection unit 124 is employed to detect and remedy such pipeline conflicts.

Generally speaking, conflict detection unit 124 compares the steering words corresponding to instructions within each pipeline stage to the steering word corresponding to an instruction being provided to first pipeline stage 122A (the "issuing instruction"). If the comparisons indicate that an instruction within the pipeline and the issuing instruction would arrive at the same pipeline stage during the same clock cycle if the issuing instruction were allowed to issue, then conflict detection unit 124 inhibits issuance of the issuing instruction (via an inhibit signal 127 conveyed to the mechanism (not shown) which issues instructions to first pipeline stage 122A). During some subsequent clock cycle, the instruction within the pipeline will progress and the conflict will no longer be detected. The issuing instruction will then be allowed to issue. It is noted that conflict detection unit 124 may be configured to receive the steering words of instructions placed into instruction processing pipeline 120 and to route the steering words through a pipeline within conflict detection unit 124 which mimics pipeline 120 in order to perform conflict detection. It is further noted that, in an alternative configuration, conflict detection unit 124 may be distributed among the pipeline stages 122 and conflict signals may be routed between the pipeline stages 122 to indicate detection of a conflict.

Although tristating drivers 126 are shown in FIG. 5 (and FIGS. 11 and 12 below) near the receiving pipeline stage 122 for clarity in the drawing, tristating drivers 126 may typically be implemented within the driving pipeline stage 122. For example, tristating drivers 126A and 126D may be implemented within pipeline stage 122A.

Figure 6:
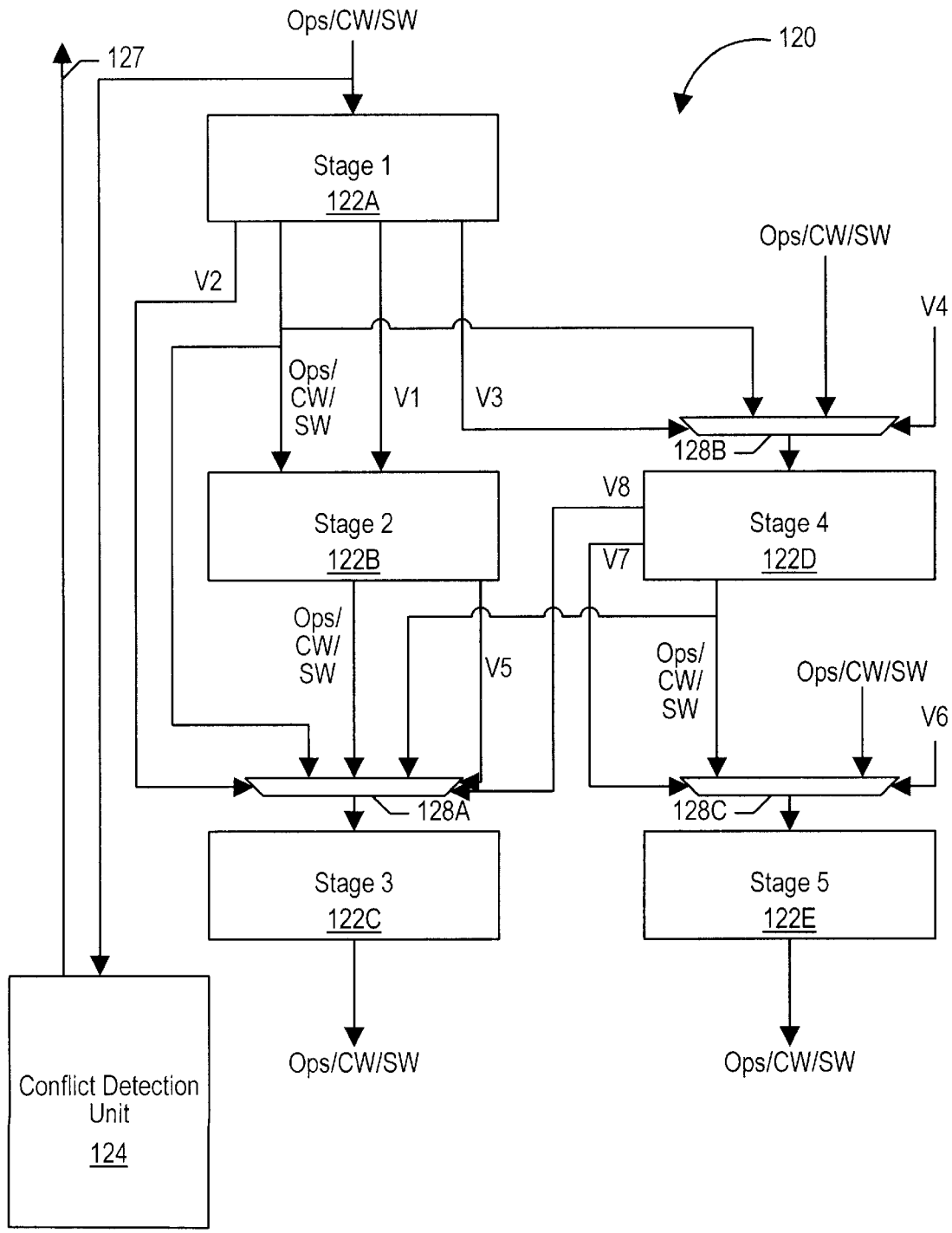
FIG. 6 is a block diagram illustrating a portion of a second embodiment of an instruction processing pipeline.

Turning next to FIG. 6, a second embodiment of the portion of instruction processing pipeline 120 shown in FIG. 5 is shown. As shown in FIG. 6, instruction processing pipeline 120 includes pipeline stages 122A-122E and conflict detection unit 124, similar to the embodiment of FIG. 5. However, the embodiment of FIG. 6 employs multiplexors 128A, 128B and 128C to select between inputs from various pipeline stages instead of tristating drivers. Each stage which is configured to provide an input to a given stage generates a selection control for the corresponding multiplexor 128A–128C. When the selection control is asserted, the corresponding input is selected by the multiplexor. For the embodiment of FIG. 6, the steering field for each pipeline stage is used by the pipeline stage to generate the selection controls for each multiplexor to which it is coupled. For example, selection controls V1, V2, and V3 are generated by first pipeline stage 122A in response to the steering field received by first pipeline stage 122A for a given instruction. It is noted that any suitable routing hardware may be employed using steering words as defined herein.

Figure 7:
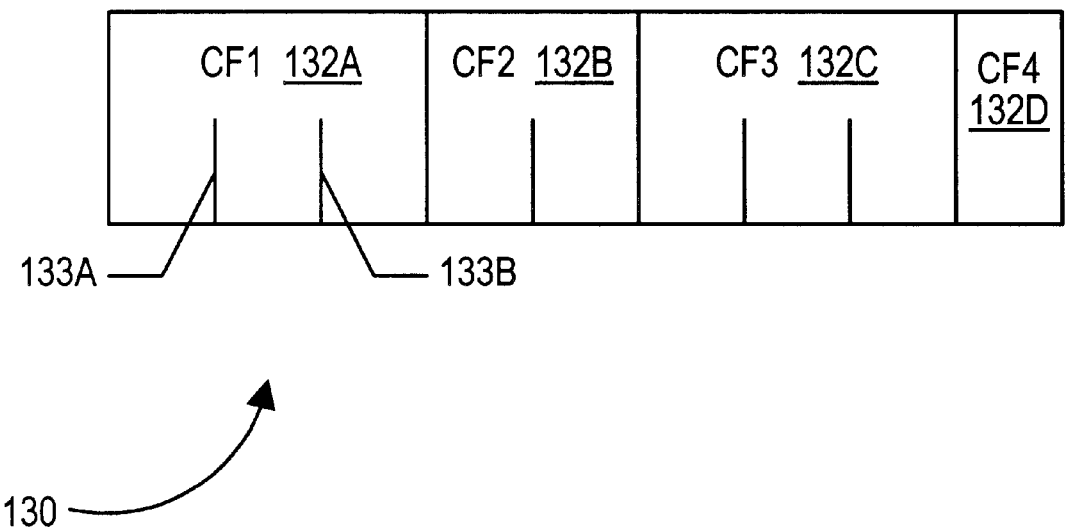
FIG. 7 is a diagram illustrating one embodiment of a control word.

Turning next to FIG. 7, a diagram illustrating one embodiment of a control word 130 is shown. Control word 130 includes multiple control fields 132A, 132B, 132C, and 132D. Control field 132A is used by a first pipeline stage to which the corresponding instruction is conveyed. Similarly, control field 132B is used by a second pipeline stage to which the corresponding instruction is conveyed (i.e. the pipeline stage to which the corresponding instruction is conveyed by the first pipeline stage). Control field 132C is used by a third pipeline stage to which the corresponding instruction is routed by the second pipeline stage. Control field 132D is used by a fourth pipeline stage. Although illustrated in FIG. 7 as four fields, control word 130 includes a control field for each pipeline stage to which the corresponding instruction is conveyed, with the exception of any pipeline stages which do not use any control signals.

Generally speaking, the control word as originally generated for an instruction upon entrance into an instruction processing pipeline has a fixed width. The width of control word 130 is determined by the particular instruction which requires the largest number of control signals throughout its passage through the instruction processing pipeline. Other instructions which utilize fewer control signals do not utilize each bit in control word 130 (i.e. a number of bits are don't cares). It is noted that the instruction which determines the width of control word 130 may not be the instruction which traverses the largest number of pipeline stages. Instead, the instruction using the largest number of control signals within the pipeline stages traversed by that instruction determines the width of the control word.

Each of control fields 132A–132D is illustrated having zero or more short vertical lines included therein. For example, control field 132A includes vertical lines 133A and 133B. The vertical lines delimit bits within each of the control fields. Therefore, as shown in FIG. 7, control field 132A includes three bits, control field 132B includes two bits, control field 132C includes three bits, and control field 132D includes one bit. Control word 130 illustrates that the number of bits in each control field 132A–132D may vary according to the number of control signals used by a given pipeline stage. Since different instructions may pass through different pipeline stages, the control word for each instruction may include different numbers of control fields 132, and the number of bits included in each field may differ for different instructions.

Figure 8:
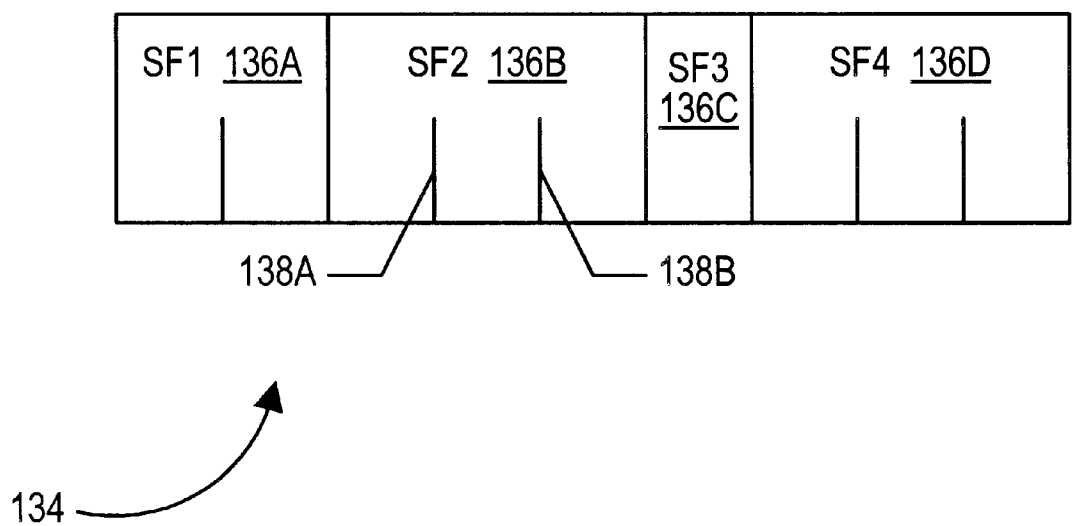
FIG. 8 is a diagram illustrating one embodiment of a steering word.

FIG. 8 illustrates one embodiment of a steering word 134. Steering word 134 includes multiple steering fields 136A, 136B, 136C, and 136D. Steering field 136A is used by a first pipeline stage to which the corresponding instruction is conveyed. Similarly, steering field 136B is used by a second pipeline stage to which the corresponding instruction is conveyed (i.e. the pipeline stage to which the corresponding instruction is conveyed by the first pipeline stage in response to steering field 136A). Steering field 136C is used by a third pipeline stage to which the corresponding instruction is routed by the second pipeline stage in response to steering field 136B. Steering field 136D is used by a fourth pipeline stage. Although illustrated in FIG. 8 as four fields, steering word 134 includes a steering field for each pipeline stage to which the corresponding instruction is conveyed, with the exception of any pipeline stages which route instructions to only one other pipeline stage.

Similar to the control word, the steering word as originally generated for an instruction upon entrance into an instruction processing pipeline has a fixed width. The width of steering word 134 is determined by the particular instruction which requires the largest number of bits to identify the appropriate steering selections throughout its passage through the instruction processing pipeline. Other instructions which utilize fewer bits do not utilize each bit in steering word 134 (i.e. a number of bits are don't cares). It is noted that the instruction which determines the width of steering word 134 may not be the instruction which traverses the largest number of pipeline stages. Instead, the instruction which passes through the pipeline stages which may route to the largest number of other pipeline stages determines the width of the steering word.

Each of steering fields 136A–136D is illustrated having zero or more short vertical lines included therein. For example, steering field 136B includes vertical lines 138A and 138B. The vertical lines delimit bits within each of the steering fields. Therefore, as shown in FIG. 8, steering field 136A includes two bits, steering field 136B includes three bits, steering field 136C includes one bit, and steering field 136D includes three bit. Steering word 134 illustrates that the number of bits in each steering field 136A–136D may vary according to the number of routing choices at a given pipeline stage. Since different instructions may pass through different numbers of pipeline stages, the steering word for each instruction may include different numbers of steering fields 136, and the number of bits included in each field may differ for different pipeline stages based upon the number of routine choices leaving that stage.

Figure 9:
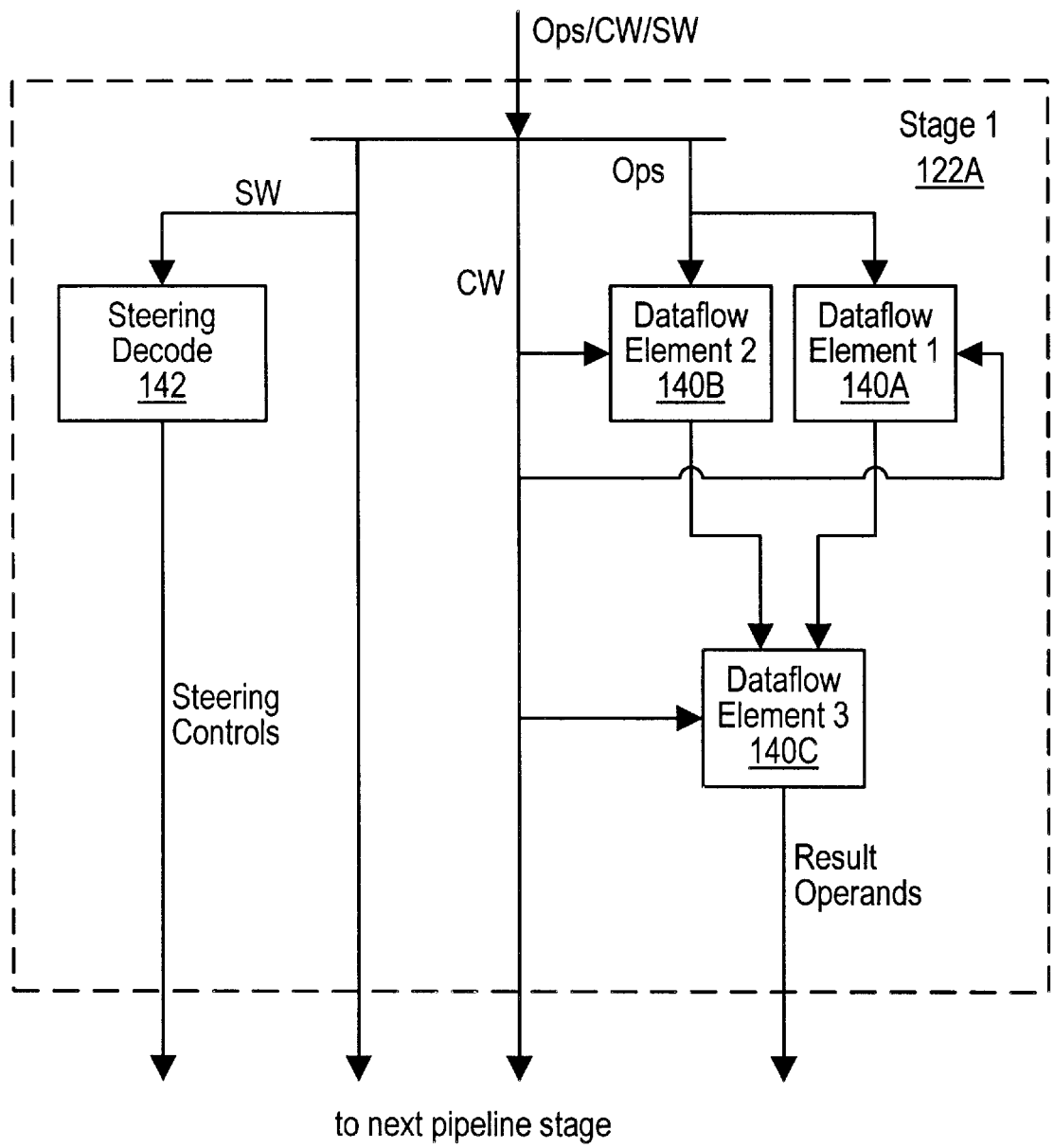
FIG. 9 is a block diagram of one embodiment of a pipeline stage.

Turning next to FIG. 9, a block diagram of one embodiment of first pipeline stage 122A is shown. Other pipeline stages 122 may be configured similarly. First pipeline stage 122A includes multiple dataflow elements 140A, 140B, and 140C. Additional, a steering decode block 142 is included.

Dataflow elements 140 are arranged to perform the operation assigned to first pipeline stage 122A. Generally speaking, a dataflow element is a circuit which is configured to receive one or more operands and produce a result based upon one or more control signals. Dataflow elements may include arithmetic/logical dataflow elements such as adders, multipliers, shifters, etc. The control signals may include carry-ins or shift amounts, for example. Additionally, dataflow elements may include data routing and storage devices such as multiplexors and registers. The control signals may include select signals and clock signals, for example.

Dataflow elements 140 are coupled to receive the operands provided to first pipeline stage 122A. Additionally, the control signals used by each dataflow element are provided from the control word received by first pipeline stage 122A. Under control of the control signals from the control word, dataflow elements 140 perform an operation upon the input operand or operands and produce a result operand or operands which is to be conveyed to the next pipeline stage (as selected by the steering word).

Steering decode block 142 decodes the steering field corresponding to first pipeline stage 122A into one or more steering controls which are conveyed to the steering devices (e.g. the multiplexors 128 shown in FIG. 6 or the tristate drivers 126 shown in FIG. 5). It is noted that, if the steering field is not encoded (i.e. each bit is actually a steering control signal), then steering decode block 142 is not included in first pipeline stage 122A.

In addition to providing control and routing for first pipeline stage 122A, the control word and steering word are routed to the next pipeline stage. According to one embodiment, the control field and steering field used by first pipeline stage 122A are deleted from the control word and the steering word (respectively) prior to conveying the control word and steering word to the next pipeline stage.

Figure 10:
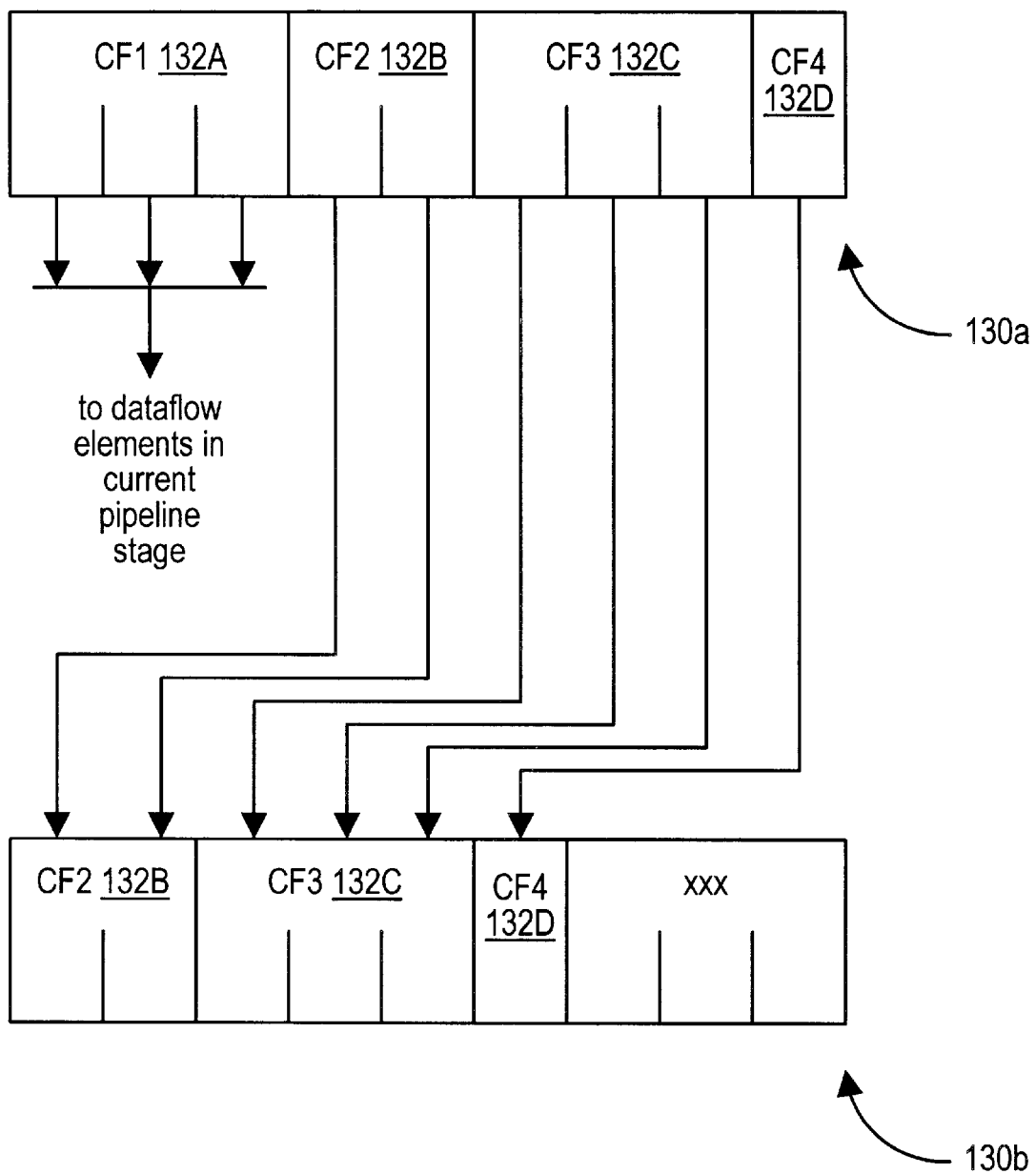
FIG. 10 is a diagram illustrating the shifting of a control word within a pipeline stage.

Turning next to FIG. 10, a diagram illustrating the deletion of a control field 132A from control word 130 is shown. Control field 132A corresponds to a current pipeline stage (i.e. a pipeline stage operating upon the corresponding instruction during a particular clock cycle). The control word provided to the current pipeline stage is illustrated at reference numeral 130*a*. The control word conveyed from the current pipeline stage to the next pipeline stage is illustrated at reference numeral 130*b*.

The bits comprising control field 132A are routed to the dataflow elements within the current pipeline stage according to the definition of the dataflow elements. The remaining control fields are shifted down simply by routing the appropriate conductors out of the current pipeline stage. Since the pipeline stage uses a particular number of control bits (i.e. the size of the corresponding control field 132A), the remaining bits of the control word can be hard wired into lower order positions by the number of bits used. For example, in FIG. 10 three control bits are used by the current pipeline stage. Therefore the fourth bit within control word 130*a* is routed into the first bit of control word 130*b* (i.e. the bit at the end of control word 130*b*). The remaining bits are routed into succeeding bit positions within control word 130*b*. In this manner, the second control field 132B within control word 130*a* is moved to the end of control word 130*b*. The second control field is thereby available at the end of control word 130*b* for use by the next pipeline stage. Bits at the other end of control word 130*b* are filled with don't care bits (i.e. the "xxx" field shown in control word 130*b*). For example, these bits may be set to binary zeros or binary ones. Any other suitable pattern of bits may be used as well. It is noted that the steering field corresponding to the current pipeline stage may by similarly deleted from the steering word.

Figure 11:
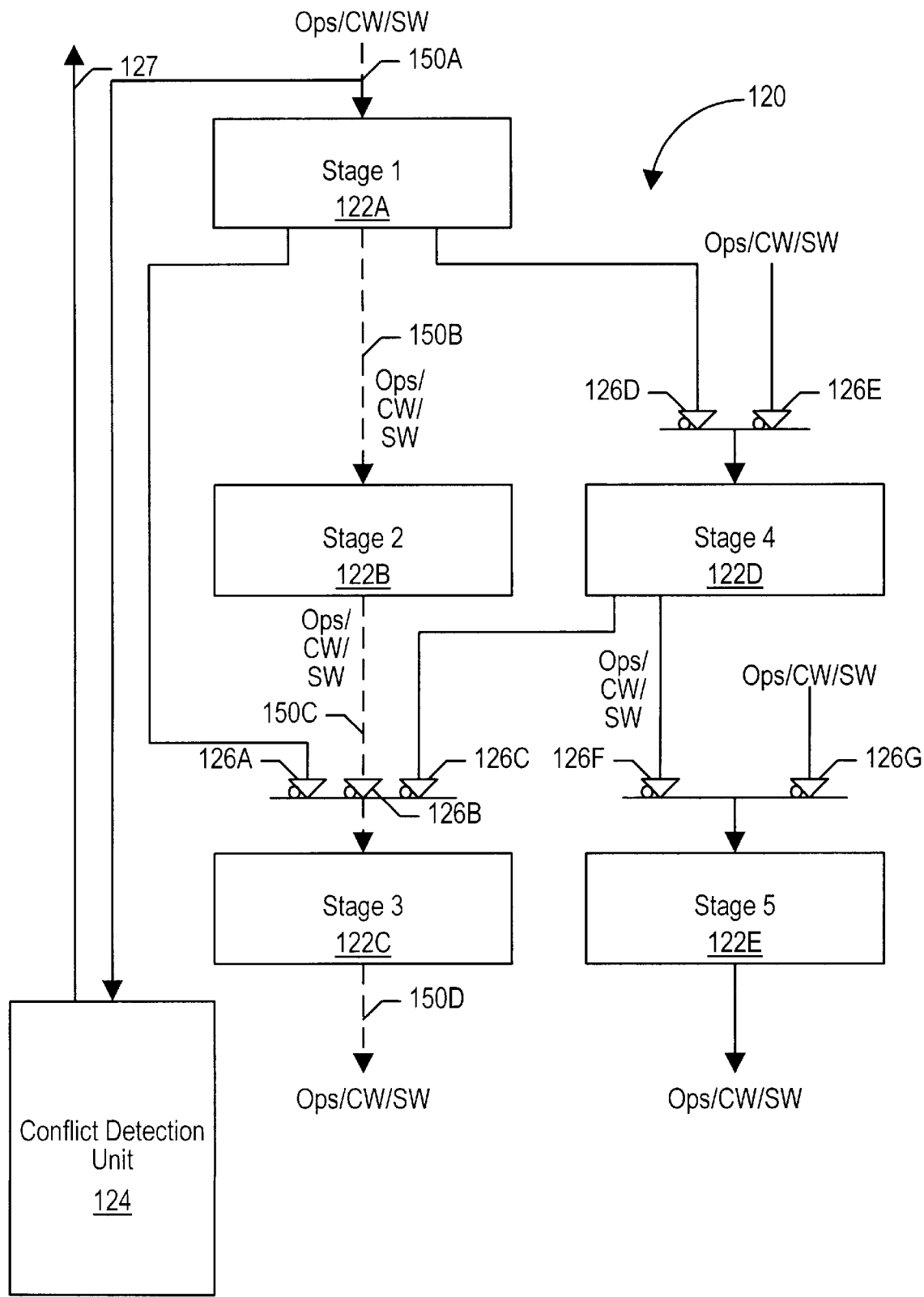
FIG. 11 is an illustrates a first instruction's flow through the portion of the instruction processing pipeline shown in FIG. 5.

Turning now to FIG. 11, the path a first instruction takes through the portion of instruction processing pipeline 120 shown in FIG. 5 is shown. The path is illustrated via dotted lines 150A, 150B, 150C, and 150D. The first instruction is received by first pipeline stage 122A (line 150A). The operation assigned to first pipeline stage 122A is performed upon the operands of the first instruction in response to the control word accompanying the first instruction. Additionally, the steering word accompanying the first instruction indicates that the first instruction is to be routed to second pipeline stage 122B. Therefore, first pipeline stage 122A routes the result of its operation, other instruction information, the control word, and the steering word to second pipeline stage 122B (line 150B). The routing may be accomplished, for example, by deasserting enable signals to tristating drivers 126A and 126D (thereby inhibiting transmittal of the first instruction to third pipeline stage 122C and fourth pipeline stage 122D, respectively) and by asserting a validity indication within the information conveyed to second pipeline stage 122B.

Second pipeline stage 122B performs the operation assigned thereto upon the received operands under the control of the control word and routes the first instruction, the resulting operands, the control word and the steering word to third pipeline stage 122C (line 150C). Since second pipeline stage 122B as shown in FIG. 11 only routes instructions to third pipeline stage 122C, a steering field corresponding to second pipeline stage 122B may not be included in the steering word for the first instruction.

Third pipeline stage 122C receives the first instruction and performs an operation assigned thereto upon the operands of the first instruction. In response to the steering word, third pipeline stage 122C routes the resulting values, the first instruction, the control word, and the steering word to a succeeding pipeline stage (not shown).

Figure 12:
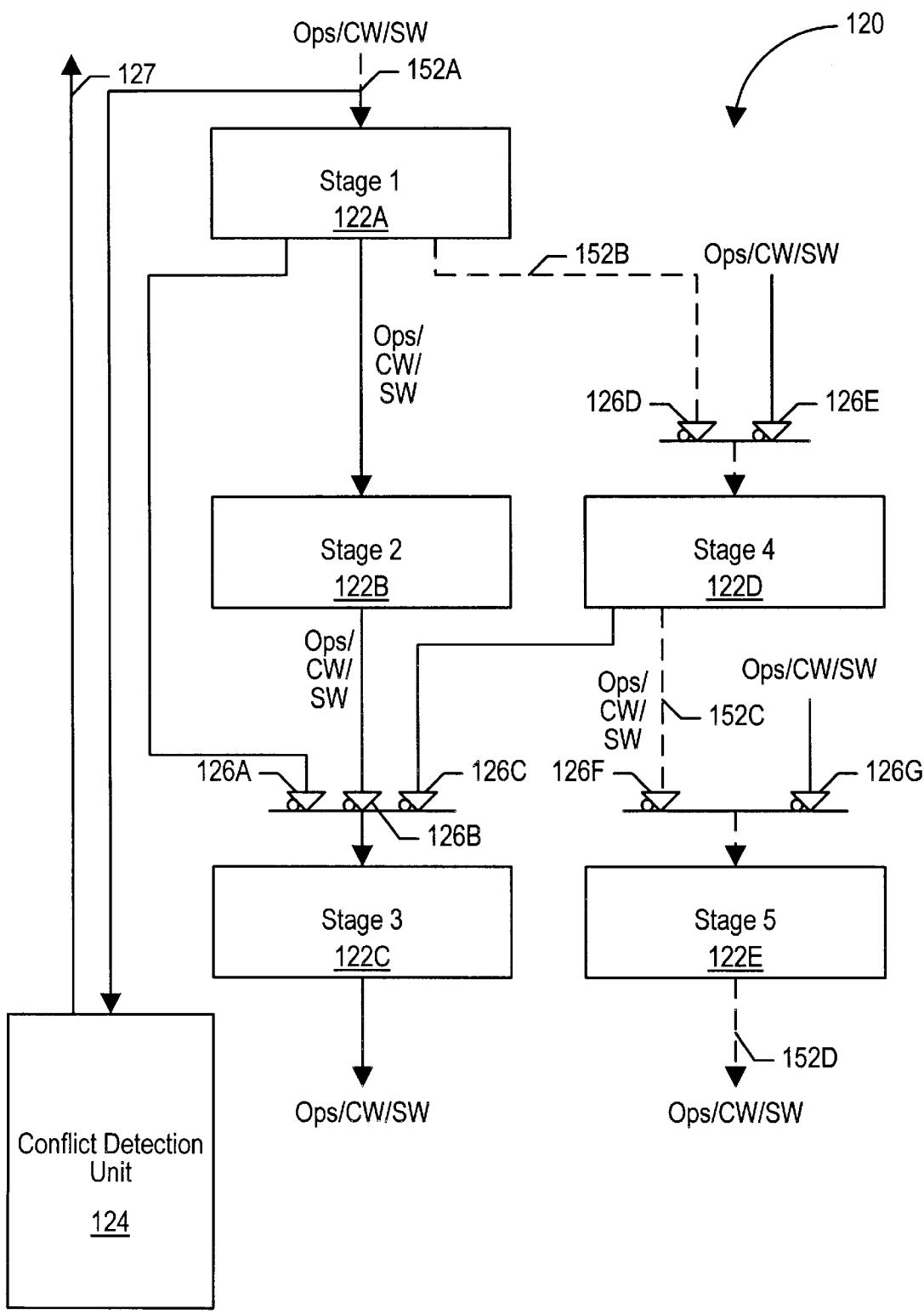
FIG. 12 is an illustrates a second instruction's flow through the portion of the instruction processing pipeline shown in FIG. 5.

Turning next to FIG. 12, the path a second instruction takes through the portion of instruction processing pipeline 120 shown in FIG. 5 is shown. The path is illustrated via dotted lines 152A, 152B, 152C, and 152D. The second instruction is received by first pipeline stage 122A (line 152A). The operation assigned to first pipeline stage 122A is performed upon the operands of the second instruction in response to the control word accompanying the second instruction. Additionally, the steering word accompanying the second instruction indicates that the second instruction is to be routed to fourth pipeline stage 122D. In contrast to the steering word for the first instruction referred to above in FIG. 11, the steering word for the second instruction includes a different encoding of the steering field corresponding to first pipeline stage 122A. Therefore, first pipeline stage 122A routes the result of its operation, other instruction information, the control word, and the steering word to second pipeline stage 122B (line 152B). The routing may be accomplished, for example, by deasserting the enable signal to tristating driver 126A (thereby inhibiting transmittal of the second instruction to third pipeline stage 122C), by asserting the enable signal to tristating driver 126D (thereby transmitting the second instruction to fourth pipeline stage 122D), and by deasserting a validity indication within the information conveyed to second pipeline stage 122B.

Fourth pipeline stage 122D performs the operation assigned thereto upon the received operands under the control of the control word. The steering word includes a steering field corresponding to fourth pipeline stage 122D. The steering field indicates that the second instruction is to be routed to fifth pipeline stage 122E. Fourth pipeline stage 122D routes the second instruction, the resulting operands, the control word and the steering word to fifth pipeline stage 122E (line 152C). The routing may be accomplished, for example, by deasserting the enable signal to tristating driver 126C (thereby inhibiting transmittal of the second instruction to third pipeline stage 122C) and by asserting the enable signal to tristating driver 126F (thereby transmitting the second instruction to fifth pipeline stage 122D).

Fifth pipeline stage 122E receives the second instruction from fourth pipeline stage 122D and performs an operation assigned thereto upon the operands of the second instruction. In response to the steering word, fifth pipeline stage 122E routes the resulting values, the second instruction, the control word, and the steering word to a succeeding pipeline stage (not shown).

Contrasting the examples shown in FIGS. 11 and 12, the steering word corresponding to the first instruction includes a first steering field corresponding to first pipeline stage 122A and a second steering field corresponding to third pipeline stage 122C. Since second pipeline stage 122B only has one routing choice, a steering field need not be included for second pipeline stage 122B. Alternatively, the steering word corresponding to the second instruction includes three steering fields: a first steering field corresponding to first pipeline stage 122A, a second steering field corresponding to fourth pipeline stage 122D, and a third steering field corresponding to fifth pipeline stage 122E. Additionally, the control word corresponding to the first instruction may include three control fields: a first control field corresponding to first pipeline stage 122A, a second control field corresponding to second pipeline stage 122B, and a third control field corresponding to third pipeline stage 122C. The control word corresponding to the second instruction also includes three control fields. However, the second control field corresponds to fourth pipeline stage 122D and the third control field corresponds to fifth pipeline stage 122E. Since the fourth and fifth pipeline stages are assigned different operations than the second and third pipeline stages, the second and third control fields of the control word corresponding to the second instruction differ from the second and third control fields of the control word corresponding to the first instruction. The second and third control fields may differ both in value and in numbers of bits.

It is noted that the generality of the control word/steering word approach may further simplify pipeline control in other ways. For example, if a given instruction loops through one or more pipeline stages several times in order to complete an instruction, the looping can be coded into the steering word. In such a case, a particular pipeline stage has a feedback patch (specifiable via a particular steering field encoding) to a prior pipeline stage or to the particular pipeline stage itself, if a single pipeline stage loop is desired. Instead of using a state machine to count the number of passes the instruction has made through the loop, the steering word is coded with steering controls which automatically route the instruction through the loop the appropriate number of iterations. The steering fields causing the looping action to occur are deleted from the steering word as the loops are accomplished, and eventually a steering field causes the instruction to transfer out of the loop to a succeeding pipeline stage.

It is noted that, in one implementation, the control word may be modified (in addition to the deletion of control fields) by a pipeline stage. For example, the control signals received by a pipeline stage may depend upon a value calculated by a previous pipeline stage. The previous pipeline stage may calculate the value and insert the value into the control word. Advantageously, the control signals are still contained within the control word, even in cases in which the control signals are calculated within the pipeline. Furthermore, the previous pipeline stage may calculate control signals for more than one subsequent pipeline stage. The previous pipeline stage calculates the control signals and the steering field corresponding to the previous pipeline stage routes the control word (including the calculated control signals) to the appropriate subsequent pipeline stage.

Figure 13:
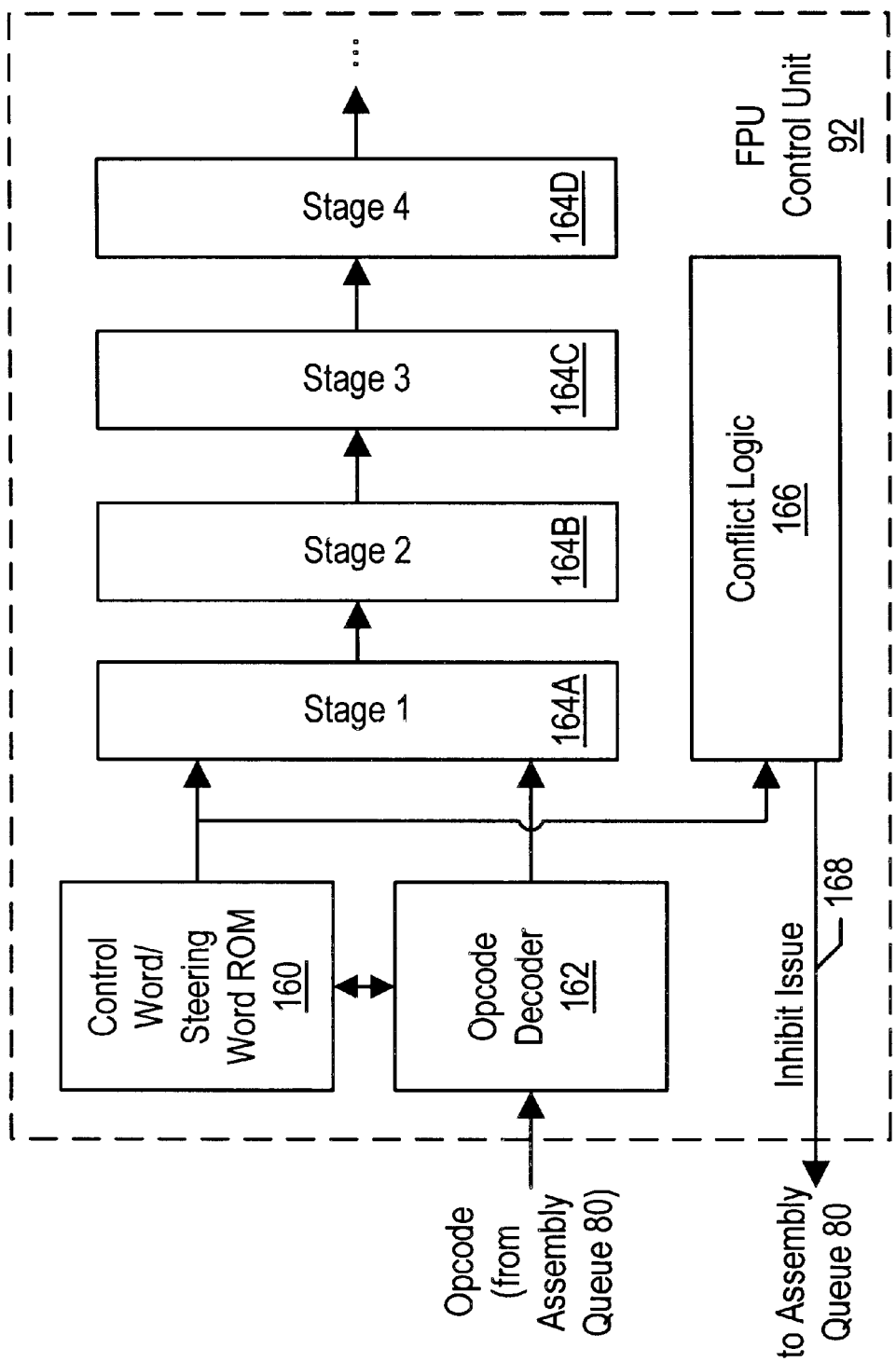
FIG. 13 is a block diagram of one embodiment of an FPU control unit shown in FIG. 4.

Turning next to FIG. 13, a block diagram of one embodiment of FPU control unit 92 is shown. As shown in FIG. 13, FPU control unit 92 includes a control word/steering word ROM 160, and opcode decoder 162, a plurality of pipeline stages 164A–164D, and a conflict logic 166. Opcode decoder 162 is coupled to receive the opcode of an instruction being dispatched from assembly queue 80 and is coupled to ROM 160 and pipeline stage 164A. ROM 160 is coupled to pipeline stage 164A as well. Pipeline stages 164 are interconnected in a fashion that allows the floating point instructions to be executed, thereby forming an execution pipeline for FPU 36. Additionally, ROM 160 is coupled to conflict logic 166.

The embodiment of FPU control unit 92 illustrated in FIG. 13 is employed by an embodiment of FPU 36 which employs the control word/steering word approach in its execution pipeline. ROM 160 is programmed with a control word and a steering word corresponding to each floating point instruction. As a particular instruction is selected from assembly queue 80 for dispatch, while its register specifiers are translated by translation unit 82 and are applied to register stack 84 to read register operands, opcode decoder 162 decodes the opcode of the particular instruction. Via decoding the opcode, opcode decoder 162 generates an address for ROM 160 at which the control word and steering word corresponding to the particular instruction is stored. Opcode decoder 162 conveys the generated address to ROM 160, which reads the corresponding control word and steering word and conveys them to pipeline stage 164A. It is noted that pipeline stages 164 may comprise the control portion of the execution pipeline while corresponding pipeline stages (not shown) in FPU core 94 comprise the dataflow portion of the execution pipeline. ROM 160 may convey the control word and steering word to FPU core 94 as well in order to direct the control and routing of the dataflow pipeline stages.

Since the control words and steering words for the instructions are stored in ROM 160, changing the operation of the execution pipeline is simplified. Instead of having to locate and redesign specialized decoding logic at each pipeline stage 164, the values stored in ROM 160 are updated. If a change to the execution pipeline causes a control field or steering field for a given pipeline stage to change (in terms of numbers of bits), the conductors routing the control word and/or steering word out of the given pipeline stage may be rerouted to reflect the increase or decrease in the number of bits comprising the control field or steering field used by the given pipeline stage. Advantageously, many execution pipeline changes may be effected simply by changed the values stored in ROM 160. Execution pipeline changes may occur, for example, due to redesigns of dataflow elements in a particular stage. Alternatively, partitioning of the execution of instructions may be changed in order to meet timing goals. Still further, custom instructions for use by FPU microcode routines may be added simply by adding entries to ROM 160 instead of modifying control logic throughout the execution pipeline. As an alternative to ROM 160, a block of synthesized logic may be employed. The block of logic would maintain the advantages of localizing the changes to the block of logic (as opposed to modifying distributed control logic.

Conflict logic 166 detects conflicts between instructions in the execution pipeline and an instruction to be issued into pipeline stage 164A. A conflict exists if the steering words indicate that the issuing instruction and an instruction within the execution pipeline are scheduled to move to the same pipeline stage 164 during a particular clock cycle. Conflict logic 166 compares the steering words being used by each pipeline stage to the steering word of the issuing instruction (received from ROM 160) and inhibits issuance of the issuing instruction when a conflict is detected. Conflict logic 166 inhibits issuance of the issuing instruction by asserting an inhibit issue signal upon an inhibit issue conductor 168 coupled to assembly queue 80. Therefore, conflict logic 166 performs the duties of conflict detection unit 124 as shown in FIGS. 5 and 6.

Additionally, conflict logic 166 may stall the dispatch of a particular instruction into the instruction processing pipeline in order to ensure that instructions arrive in result queue 96 in program order, according to one embodiment. For such an embodiment, ROM 160 stores a latency number indicative of the number of clock cycles each instruction uses to pass through the execution pipeline. The latency number is of an instruction being dispatched is sent into the execution pipeline along with the instruction. Each clock cycle in which the execution pipeline is not stalled, the latency numbers of the instructions within the execution pipeline are decremented. When a particular instruction is being dispatched, the latency number for the particular instruction (read from ROM 160) is compared to the latency numbers of the instructions within the execution pipeline. If the latency number corresponding to the particular instruction is greater than the latency numbers of the instructions within the execution pipeline, the particular instruction is allowed to dispatch. If the latency number corresponding to the particular instruction is less than or equal to any of the latency numbers of the instructions within the execution pipeline, the particular instruction is stalled until the latency number becomes greater than those of instructions within the execution pipeline. It is noted that other embodiments, particularly ones which allow instructions to arrive in result queue 96 out of order, may not employ the latency number comparisons and may allow instructions to dispatch without delay.

Figure 14:
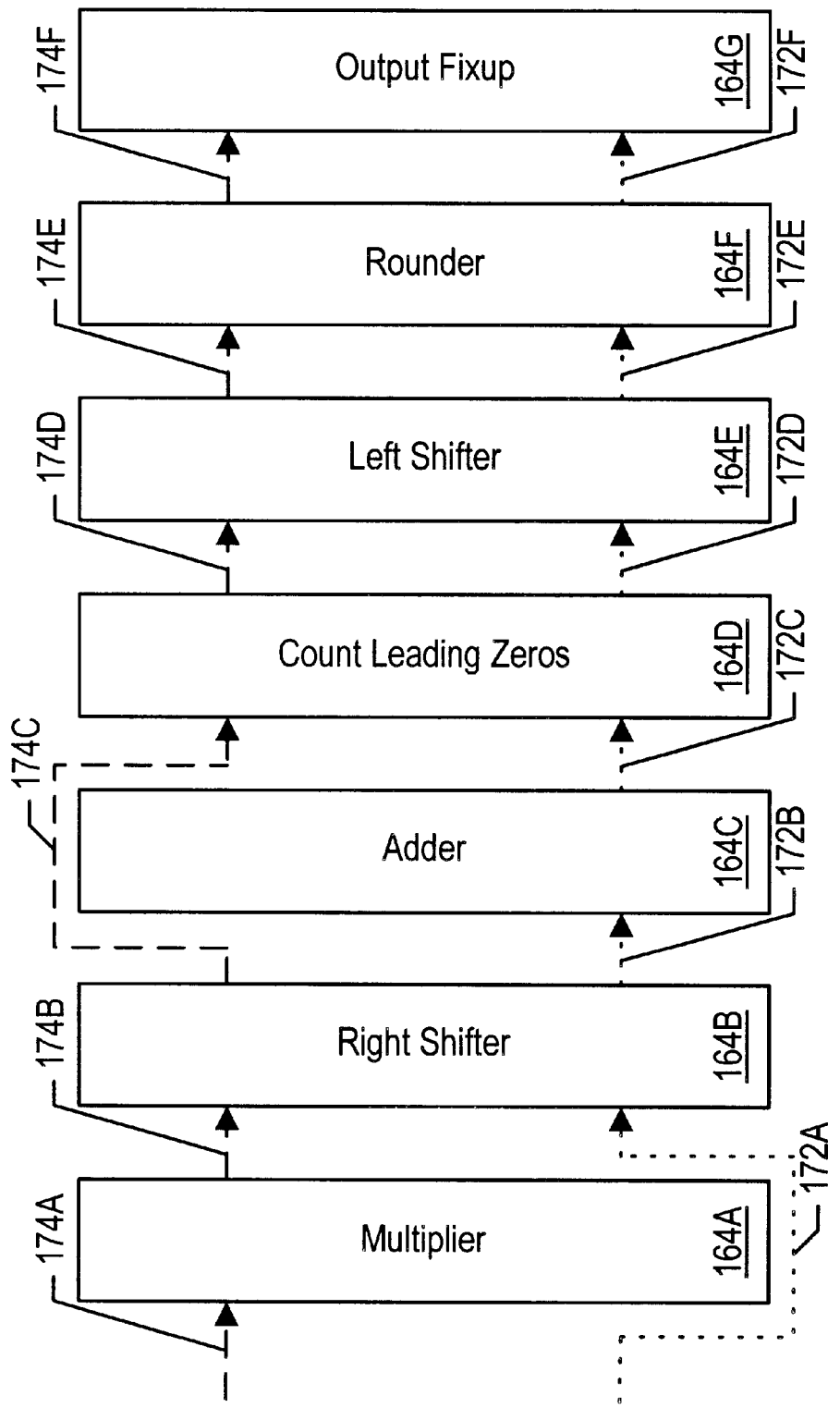
FIG. 14 a pipeline diagram illustrating an exemplary execution pipeline employed by one embodiment of the floating point unit shown in FIG. 4.

Turning next to FIG. 14, an exemplary execution pipeline 170 which may be employed by one embodiment of FPU 36 is shown. Other embodiments of FPU 36 may employ any number of pipeline stages and may divide the floating point functionality among the stages in any desirable fashion.

Pipeline 170 includes stages 164A–164G. A given instruction may skip one or more pipeline stages in response to the steering word corresponding to the given instruction. For example, a floating point addition does not require multiplication, and therefore may skip pipeline stage 164A. Dotted lines 172A–172F illustrate the route a floating point add instruction takes through pipeline 170. In contrast, a floating point multiplication may not require use of the hardware in adder stage 164C. Dotted lines 174A–174F illustrate the route a floating point multiply instruction takes through the pipeline 170. Different control and steering words are generated for each floating point instruction according to its use or lack of use of multiplier stage 164A and adder stage 164C. Yet another path, not shown in FIG. 14, is used by instructions which update a register within FPU environment 88. These instructions may bypass all of the pipeline stages 164 and move directly to result queue 96 (assuming pipeline stages 164 are empty, according to an in-program-order embodiment of FPU 36).

Multiplier stage 164A is used to perform multiplication of floating point numbers. Similarly, right shift stage 164B performs right shift operations. Adder stage 164C performs the addition of floating point numbers. Count leading zeros stage 164D is used to count the leading zeros in the result significand, in order to place the result into normal form (i.e. one binary one digit to the right of the binary point). Left shifter stage 164E left shifts the significand according to the number of leading zeros provided by count leading zeros stage 164D, and adjusts the exponent accordingly. Rounder stage 164F rounds the result according to the rounding mode which was conveyed with the corresponding instruction. Finally, output fixup stage 164G is used to force the special encodings (zero, infinity, denormalized number, etc.) if the input operands or the result are special numbers. It is noted that, according to one embodiment, rounder stage 164F performs only the rounding of floating point numbers in accordance with the rounding mode conveyed with the instruction. It is noted than many other datapaths are possible. For example, the add and round operations may be performed in a single pipeline stage, etc.

It is noted that both FPU control unit 92 and FPU core 94 may implement execution pipeline 170. FPU control unit 92 conveys control information through its pipeline, and FPU core 94 conveys the operand values and intermediate results between the corresponding pipeline stages. Circuitry at each stage in the pipeline of FPU control unit 92 controls the corresponding circuitry within the pipeline of FPU core 94 according to control information for the instruction.

Figure 15:
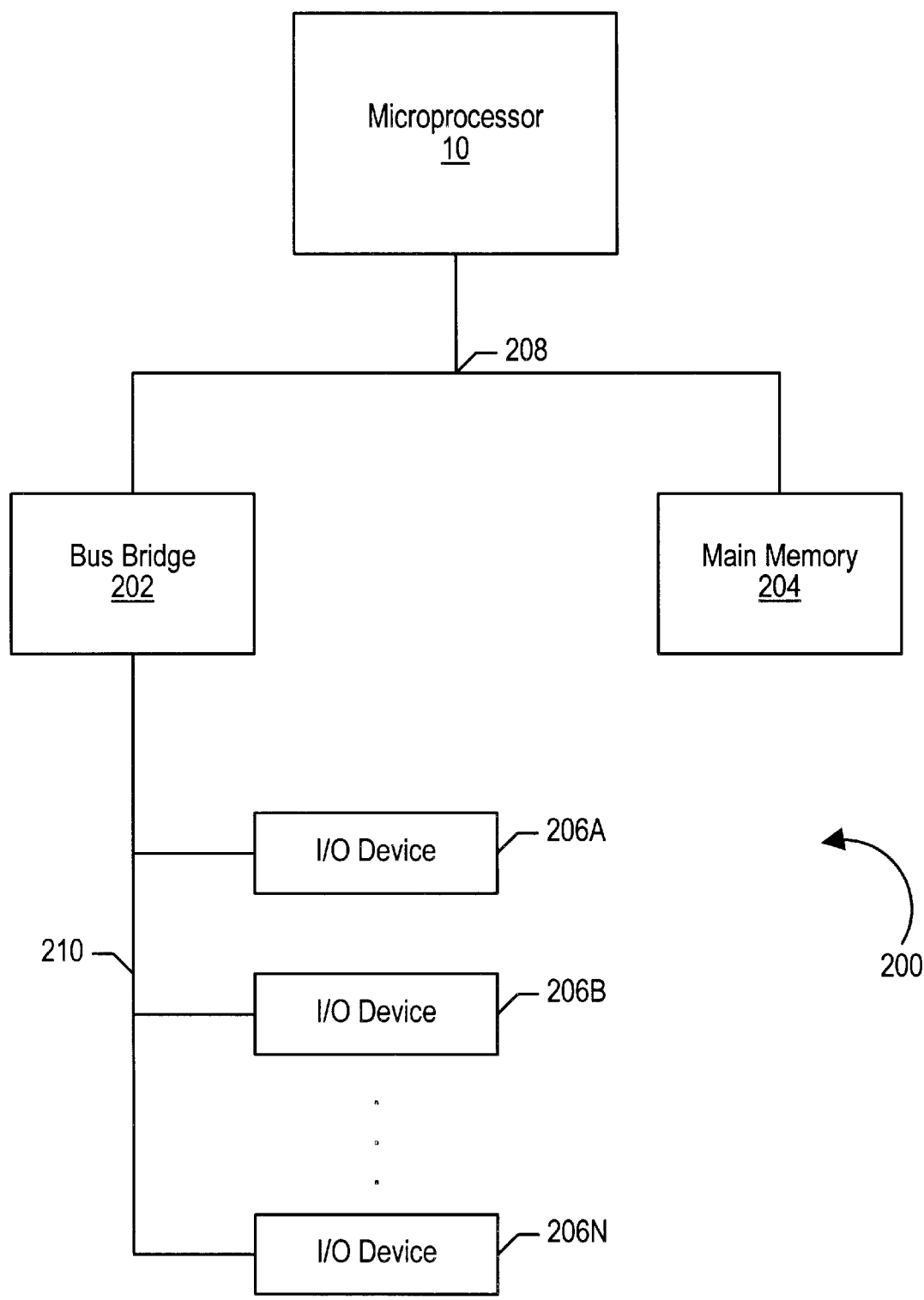
FIG. 15 is a block diagram of one embodiment of a computer system including the microprocessor shown in FIG. 1.

Turning now to FIG. 15, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 15 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |

TABLE 1-continued x86 Fast Path, Double Dispatch, and MROM Instructions

| X86 Instruction | Instruction Category |
|---|---|
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |

TABLE 1-continued x86 Fast Path, Double Dispatch, and MROM Instructions

| X86 Instruction | Instruction Category |
|---|---|
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions. Furthermore, floating point instructions are considered to be MROM instructions.

In accordance with the above disclosure, a microprocessor has been described which employs a steering word for routing instructions through a pipeline therein and a control word for providing control signals to the pipeline stages within the pipeline. Advantageously, pipeline modifications may be simplified. Instead of having to locate numerous specialized decode logic in order to modify the pipeline, many changes may be effected simply through changing the control words and steering words for each instruction. The control words and steering words are generated at a centralized point (e.g. at the head of the pipeline), thereby centralizing the majority of the change.

Numerous variations and modifications will become apparent to those skilled in the art once the above disclosure is fully appreciated. It is intended that the following claims be interpreted to embrace all such variations and modifications.

What is claimed is:

1. An instruction processing pipeline for a microprocessor comprising:

a first pipeline stage coupled to receive a first input operand, a first control word, and a first steering word, wherein said first pipeline stage is configured to perform a first operation upon said first input operand in response to said first control word, thereby producing a first output operand, and wherein said first pipeline stage is configured to produce a second control word and a second steering word;

a second pipeline stage coupled to said first pipeline stage to receive said first output operand, said second control word, and said second steering word, wherein said second pipeline stage is configured to perform a second operation upon said first output operand, thereby producing a second output operand; and a third pipeline stage coupled to said first pipeline stage to receive said first output operand, said second control word, and said second steering word, wherein said third pipeline stage is configured to perform a third operation upon said first output operand, thereby producing a third output operand;

wherein said first pipeline stage is configured to route said first output operand, said second control word, and said second steering word to said second pipeline stage in response to a first encoding of said first steering word, and wherein said first pipeline stage is configured to route said first output operand, said second control word, and said second steering word to said third pipeline stage in response to a second encoding of said first steering word different from said first encoding; and wherein said first control word comprises a first control field and a second control field, and wherein said first control field is used by said first pipeline stage to control said first operation, and wherein said first control field comprises a first number of bits and said second control field comprises a second number of bits different from said first number.

2. The instruction processing pipeline as recited in claim 1 wherein said second control word comprises said second control field.

3. The instruction processing pipeline as recited in claim 2 wherein said first pipeline stage forms said second control word by deleting said first control field from said first control word.

4. The instruction processing pipeline as recited in claim 3 wherein said first pipeline stage forms said second control word by shifting said first control word by a number of bits included in said first control field.

5. The instruction processing pipeline as recited in claim 1 wherein said first steering word comprises a first steering field and a second steering field, and wherein said first steering field is used by said first pipeline stage to route said first output operand, said second control word, and said second steering word.

6. The instruction processing pipeline as recited in claim 5 wherein said second steering word comprises said second steering field.

7. The instruction processing pipeline as recited in claim 6 wherein said first pipeline stage forms said second steering word by deleting said first steering field from said first steering word.

8. The instruction processing pipeline as recited in claim 7 wherein said first pipeline stage forms said second steering word by shifting said first steering word by a number of bits included in said first steering field.

9. The instruction processing pipeline as recited in claim 1 further comprising a read-only memory coupled to said first pipeline stage, wherein said read-only memory is configured to store a first control word, a second control word, a first steering word, and a second steering word, and wherein said first control word and said first steering word correspond to a first instruction, and wherein said second control word and said second steering word correspond to a second instruction.

10. The instruction processing pipeline as recited in claim 9 further comprising an instruction decoder coupled to said read-only memory, wherein said instruction decoder is configured to select said first control word and said first steering word from said read-only memory for conveyance to said first pipeline stage if said first instruction is decoded, and wherein said instruction decoder is configured to select said second control word and said second steering word from said read-only memory for conveyance to said second pipeline stage if said second instruction is decoded.

11. An instruction processing pipeline for a microprocessor comprising:

a first pipeline stage coupled to receive a first input operand, a first control word, and a first steering word, wherein said first pipeline stage is configured to perform a first operation upon said first input operand in response to said first control word, thereby producing a first output operand, and wherein said first pipeline stage is configured to produce a second control word and a second steering word;

a second pipeline stage coupled to said first pipeline stage to receive said first output operand, said second control word, and said second steering word, wherein said second pipeline stage is configured to perform a second operation upon said first output operand, thereby producing a second output operand; and a third pipeline stage coupled to said first pipeline stage to receive said first output operand, said second control word, and said second steering word, wherein said third pipeline stage is configured to perform a third operation upon said first output operand, thereby producing a third output operand;

wherein said first pipeline stage is configured to route said first output operand, said second control word, and said second steering word to said second pipeline stage in response to a first encoding of said first steering word, and wherein said first pipeline stage is configured to route said first output operand, said second control word, and said second steering word to said third pipeline stage in response to a second encoding of said first steering word different from said first encoding; and wherein said first steering word comprises a first steering field and a second steering field, and wherein said first steering field is used by said first pipeline stage to route said first output operand, said second control word, and said second steering word, and wherein said first steering field comprises a first number of bits and said second steering field comprises a second number of bits different from said first number.

12. A method for routing an instruction through an instruction processing pipeline of a microprocessor comprising:

generating a control word and a steering word for said instruction, wherein said control word dictates an operation to be performed at each of a plurality of pipeline stages comprising said instruction processing pipeline, and wherein said steering word dictates which of said plurality of pipeline stages receives said instruction, and wherein said control word comprises a first control field corresponding to a first one of said plurality of pipeline stages, and wherein said first control field comprises a first number of bits, and wherein said control word comprises a second control field corresponding to a second one of said plurality of pipeline stages, and wherein said second control field comprises a second number of bits different than said first number;

conveying said instruction, said control word, and said steering word to a first one of said plurality of pipeline stages;

operating upon an operand of said instruction in said first one of said plurality of pipeline stages in response to said control word; and conveying said instruction, said control word, and said steering word to a second one of said plurality of pipeline stages in response to said steering word.

13. The method as recited in claim 12 wherein said control word comprises a plurality of control fields, and wherein a first one of said plurality of control fields corresponds to said first one of said plurality of pipeline stages and wherein a second one of said plurality of control fields corresponds to said second one of said plurality of pipeline stages.

14. The method as recited in claim 13 further comprising deleting said first one of said plurality of control fields from said control word prior to said conveying said instruction, said control word, and said steering word to said second one of said plurality of pipeline stages.

15. The method as recited in claim 12 wherein said steering word comprises a plurality of steering fields, and wherein a first one of said plurality of steering fields corresponds to said first one of said plurality of pipeline stages and wherein a second one of said plurality of steering fields corresponds to said second one of said plurality of pipeline stages.

16. The method as recited in claim 15 further comprising deleting said first one of said plurality of steering fields from said steering word prior to said conveying said instruction, said control word, and said steering word to said second one of said plurality of pipeline stages.

17. A microprocessor comprising:

an MROM unit configured to dispatch a floating point instruction to a floating point unit; and said floating point unit coupled to said MROM unit, wherein said floating point unit is configured to generate a control word and a steering word upon receipt of said floating point instruction, and wherein said floating point unit includes an execution pipeline, and wherein said floating point unit operates upon an operand of said floating point instruction within said execution pipeline in response to said control word, and wherein said floating point unit routes said floating point instruction through said execution pipeline in response to said steering word, and wherein said control word comprises a first control field corresponding to a first pipeline stage within said execution pipeline, and wherein said first control field comprises a first number of bits, and wherein said control word comprises a second control field corresponding to a second pipeline stage within said execution pipeline, and wherein said second control field comprises a second number of bits different than said first number.

18. The microprocessor as recited in claim 17 wherein said control word comprises a control field corresponding to each one of a plurality of pipeline stages comprising said execution pipeline, and wherein said steering word comprises a steering field corresponding to said each one of said plurality of pipeline stages.

19. The microprocessor as recited in claim 17 wherein said steering word comprises a first steering field corresponding to said first pipeline stage within said execution pipeline, and wherein said first steering field comprises a first number of bits, and wherein said steering word comprises a second steering field corresponding to said second pipeline stage within said execution pipeline, and wherein said second control field comprises a second number of bits different than said first number.

20. A computer system comprising:

a microprocessor including a floating point unit coupled to receive a floating point instruction, wherein said floating point unit is configured to generate a control word and a steering word in response to said floating point instruction, and wherein said floating point unit includes an execution pipeline, and wherein said floating point unit operates upon an operand of said floating point instruction within said execution pipeline in response to said control word, and wherein said floating point unit routes said floating point instruction through said execution pipeline in response to said steering word, and wherein said control word comprises a first control field corresponding to a first pipeline stage within said execution pipeline, and wherein said first control field comprises a first number of bits, and wherein said control word comprises a second control field corresponding to a second pipeline stage within said execution pipeline, and wherein said second control field comprises a second number of bits different than said first number; and an input/output (I/O) device coupled to said microprocessor and to another computer system, wherein said I/O device is configured to communicate between said computer system and said another computer system.

21. The computer system as recited in claim 20 wherein said I/O device comprises a modem.

22. The computer system as recited in claim 20 wherein said steering word comprises a first steering field corresponding to said first pipeline stage within said execution pipeline, and wherein said first steering field comprises a first number of bits, and wherein said steering word comprises a second steering field corresponding to said second pipeline stage within said execution pipeline, and wherein said second steering field comprises a second number of bits different than said first number.

* * * * *